US010558260B2

(12) United States Patent
Miller

(10) Patent No.: US 10,558,260 B2
(45) Date of Patent: Feb. 11, 2020

(54) DETECTING THE POSE OF AN OUT-OF-RANGE CONTROLLER

(71) Applicant: Microsoft Technology Licensing, LLC, Redmond, WA (US)

(72) Inventor: Quentin Simon Charles Miller, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 131 days.

(21) Appl. No.: 15/844,290

(22) Filed: Dec. 15, 2017

(65) Prior Publication Data

US 2019/0187779 A1    Jun. 20, 2019

(51) Int. Cl.
*G06F 3/01* (2006.01)
*A63F 13/235* (2014.01)
(Continued)

(52) U.S. Cl.
CPC ............ *G06F 3/011* (2013.01); *A63F 13/235* (2014.09); *A63F 13/25* (2014.09);
(Continued)

(58) Field of Classification Search
CPC . G01S 5/16; G01S 5/163; G01S 5/166; G01S 5/02; G01S 11/12; G06F 3/01;
(Continued)

(56) References Cited

U.S. PATENT DOCUMENTS 6,963,301 B2   11/2005   Schantz et al.
7,711,322 B2   5/2010   Rhodes et al.
(Continued)

FOREIGN PATENT DOCUMENTS

WO      8704028 A1    7/1987
WO   2015183621 A1   12/2015
WO   2017136833 A1    8/2017

OTHER PUBLICATIONS

Durrant-Whyte, et al., "Simultaneous Localisation and Mapping (SLAM): Part I The Essential Algorithms," in IEEE Robotics & Automation Magazine, vol. 13, No. 2, Jul. 2006, 9 pages.
(Continued)

*Primary Examiner* — Michael A Cuff

(57) ABSTRACT

A technique is described herein for determining a pose of at least one mobile controller. The technique involves using a transmitter to initially emit a magnetic field and/or electromagnetic radiation at an elevated-power level, with respect to a normal-use power level. A receiver detects the magnetic field and/or electromagnetic radiation, to provide received signals. A tracking component determines the pose of the controller based on the received signals. Thereafter, the technique transmits the magnetic field and/or electromagnetic radiation at the normal-use power level. In one implementation, a head-mounted display (HMD) uses the above-summarized technique to find the controller when the user initially dons the HMD. This is useful because the controller may be invisible to the user who dons the HMD because it is out-of-range with respect to the normal-use operating space of the HMD.

19 Claims, 13 Drawing Sheets

(51) Int. Cl.
*A63F 13/25* (2014.01)
*G02B 27/01* (2006.01)
*G06F 3/0346* (2013.01)
*G08C 17/02* (2006.01)
*G02B 27/00* (2006.01)

(52) U.S. Cl.
CPC ....... *G02B 27/0172* (2013.01); *G06F 3/0346* (2013.01); *G08C 17/02* (2013.01); *G02B 27/0093* (2013.01); *G02B 2027/014* (2013.01); *G02B 2027/0138* (2013.01); *G08C 2201/32* (2013.01)

(58) Field of Classification Search
CPC ......... G06F 3/033; G06F 3/0346; G06T 9/00; G06T 9/20
USPC .......................................................... 463/31
See application file for complete search history.

(56) References Cited

U.S. PATENT DOCUMENTS

| | | |
|---|---|---|
| 8,854,176 B2 | 10/2014 | Zeine |
| 9,024,810 B2 | 5/2015 | Lohbihler |
| 9,141,194 B1 | 9/2015 | Keyes et al. |
| 2007/0066394 A1 | 3/2007 | Ikeda et al. |
| 2007/0141985 A1 | 6/2007 | Parkkinen et al. |
| 2008/0278445 A1 | 11/2008 | Sweetser et al. |
| 2011/0109617 A1 | 5/2011 | Snook et al. |
| 2013/0106852 A1 | 5/2013 | Woodhouse et al. |
| 2013/0249784 A1 | 9/2013 | Gustafson et al. |
| 2014/0375789 A1 | 12/2014 | Lou et al. |
| 2015/0145985 A1 | 5/2015 | Gourlay et al. |
| 2015/0228114 A1 | 8/2015 | Shapira et al. |
| 2016/0027217 A1 | 1/2016 | da Veiga et al. |
| 2016/0259404 A1 | 9/2016 | Woods |
| 2016/0364907 A1 | 12/2016 | Schoenberg |
| 2016/0366537 A1 | 12/2016 | Wu |
| 2017/0038253 A1* | 2/2017 | Mallinson ............... G06F 3/011 |
| 2017/0205903 A1* | 7/2017 | Miller .................. G06F 3/0346 |
| 2017/0220119 A1 | 8/2017 | Potts et al. |
| 2017/0262045 A1* | 9/2017 | Rouvinez .............. G06T 19/006 |
| 2018/0181207 A1 | 6/2018 | Fullam et al. |
| 2019/0113966 A1* | 4/2019 | Connellan ............... G06F 3/011 |

OTHER PUBLICATIONS

Bailey, et al., "Simultaneous Localization and Mapping (SLAM): Part II," in IEEE Robotics & Automation Magazine, vol. 13, No. 3, Sep. 2006, 10 pages.

"Mixed reality," available at <<https://en.wikipedia.org/wiki/Mixed_reality>>, Wikipedia online article, accessed on Dec. 14, 2017, 4 pages.

Ribeiro, et al., "Long Range Magnetic Field Measurement with Magnetic Sensors," in Proceedings of the International Conference on Industrial Automation, Information and Communications Technology, Aug. 2014, 7 pages.

Miller, et al., "Dynamic Transmitter Power Control for Magnetic Tracker," U.S. Appl. No. 15/586,459, filed May 4, 2017, 44 pages.

International Search Report and Written Opinion Issued in PCT Application No. PCT/US2018/062392, dated Feb. 28, 2019, 16 pages.

* cited by examiner

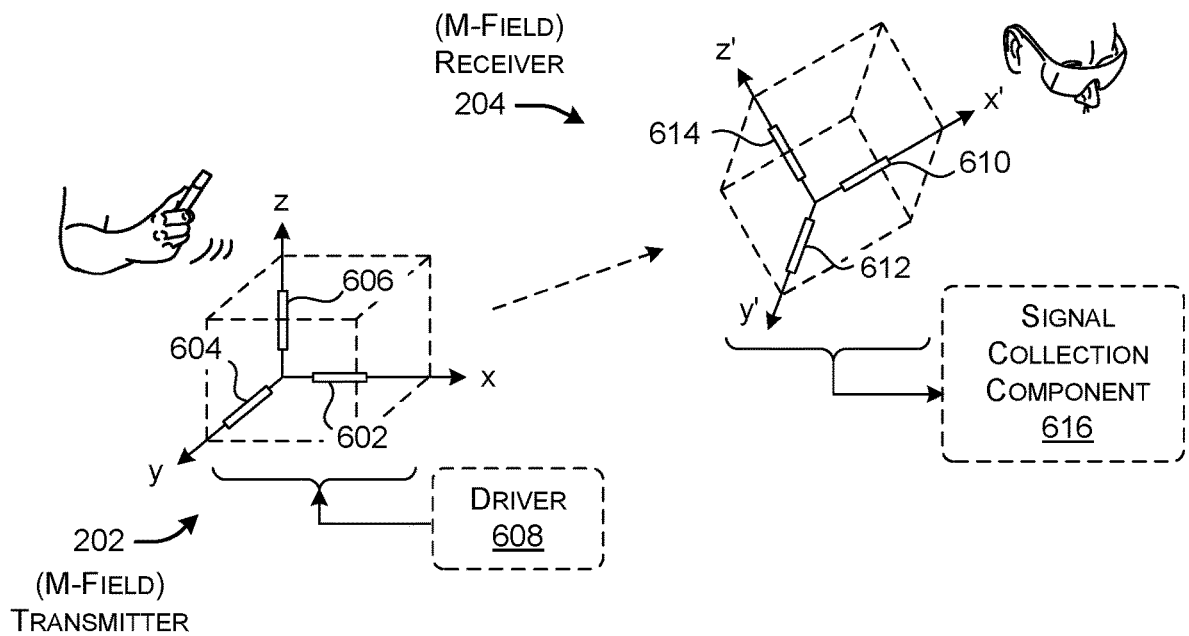
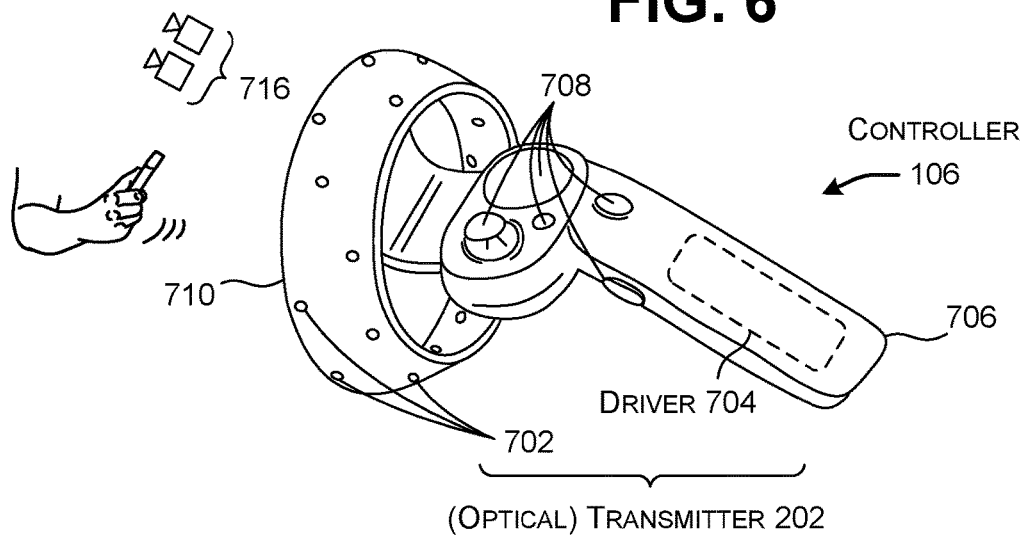
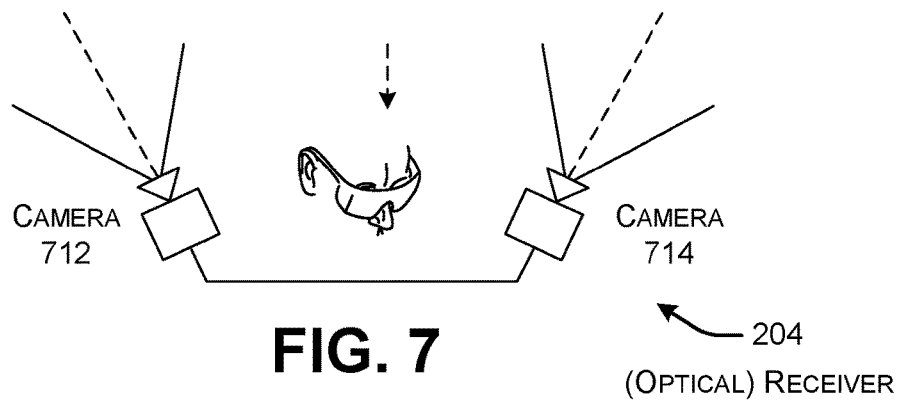
FIG. 7

```
┌─────────────────────────────────────────────────────────────────────────┐
│ DETERMINE THAT AN INITIATION EVENT HAS OCCURRED THAT INITIATES A PROCESS OF │
│         LOCATING A MOBILE CONTROLLER WITHIN A PHYSICAL ENVIRONMENT           │
│                                   1504                                       │
└─────────────────────────────────────────────────────────────────────────┘
                                      ↓
┌─────────────────────────────────────────────────────────────────────────┐
│ SEND A FIRST INSTRUCTION TO A TRANSMITTER IN RESPONSE TO THE INITIATION EVENT,│
│    WHICH INSTRUCTS THE TRANSMITTER TO USE A FIRST POWER LEVEL IN EMITTING A   │
│              MAGNETIC FIELD AND/OR ELECTROMAGNETIC RADIATION                  │
│                                   1506                                       │
└─────────────────────────────────────────────────────────────────────────┘
                                      ↓
┌─────────────────────────────────────────────────────────────────────────┐
│  RECEIVE SIGNALS FROM A RECEIVER IN RESPONSE TO DETECTING THE MAGNETIC FIELD │
│                    AND/OR ELECTROMAGNETIC RADIATION                          │
│                                   1508                                       │
└─────────────────────────────────────────────────────────────────────────┘
                                      ↓
┌─────────────────────────────────────────────────────────────────────────┐
│      DETERMINE A RELATIVE POSE OF THE CONTROLLER WITHIN THE PHYSICAL        │
│          ENVIRONMENT BASED ON THE SIGNALS THAT HAVE BEEN RECEIVED            │
│                                   1510                                       │
└─────────────────────────────────────────────────────────────────────────┘
                                      ↓
┌─────────────────────────────────────────────────────────────────────────┐
│   IN RESPONSE TO THE TERMINATION EVENT, SEND A SECOND INSTRUCTION TO THE     │
│  TRANSMITTER, WHICH INSTRUCTS THE TRANSMITTER TO EMIT THE MAGNETIC FIELD AND/│
│   OR THE ELECTROMAGNETIC RADIATION USING A SECOND POWER LEVEL. THE FIRST     │
│    POWER LEVEL IS HIGHER THAN THE SECOND POWER LEVEL, AND THE FIRST POWER    │
│   LEVEL ENABLES DETECTION OF THE CONTROLLER WHEN THE CONTROLLER IS OUT-OF-   │
│   RANGE WITH RESPECT TO A SPACE IN WHICH THE CONTROLLER OPERATES WHEN BEING  │
│   MANUALLY MANIPULATED BY THE USER IN A COURSE OF PROVIDING A MIXED-REALITY  │
│                                 EXPERIENCE.                                  │
│                                   1512                                       │
└─────────────────────────────────────────────────────────────────────────┘

DETERMINE THAT AN INITIATION EVENT HAS OCCURRED THAT INITIATES A PROCESS OF LOCATING A MOBILE CONTROLLER WITHIN A PHYSICAL ENVIRONMENT, THE CONTROLLER BEING USED IN CONJUNCTION WITH A HEAD-MOUNTED DISPLAY (HMD) TO PROVIDE A MIXED-REALITY EXPERIENCE
1604

SEND A FIRST INSTRUCTION BY THE HMD TO A TRANSMITTER IN RESPONSE TO DETECTING THE INITIATION EVENT, WHICH INSTRUCTS THE TRANSMITTER TO USE A FIRST POWER LEVEL IN EMITTING A MAGNETIC FIELD AND/OR ELECTROMAGNETIC RADIATION
1606

RECEIVE SIGNALS BY A RECEIVER IN RESPONSE TO DETECTING THE MAGNETIC FIELD AND/OR ELECTROMAGNETIC RADIATION EMITTED BY THE TRANSMITTER AT THE FIRST POWER LEVEL
1608

DETERMINE A POSE OF THE CONTROLLER WITHIN THE PHYSICAL ENVIRONMENT BASED ON THE SIGNALS THAT HAVE BEEN RECEIVED
1610

PRESENT AN INDICATOR TO THE USER USING THE HMD THAT CONVEYS THE POSE OF THE CONTROLLER
1612

SEND A SECOND INSTRUCTION TO THE TRANSMITTER, WHICH INSTRUCTS THE TRANSMITTER TO EMIT THE MAGNETIC FIELD AND/OR THE ELECTROMAGNETIC RADIATION USING A SECOND POWER LEVEL. THE FIRST POWER LEVEL IS HIGHER THAN THE SECOND POWER LEVEL, AND THE FIRST POWER LEVEL ENABLES DETECTION OF THE CONTROLLER WHEN THE CONTROLLER IS OUT-OF-RANGE WITH RESPECT TO A SPACE IN WHICH THE CONTROLLER OPERATES WHEN BEING MANUALLY MANIPULATED BY THE USER
1614

DETECTING THE POSE OF AN OUT-OF-RANGE CONTROLLER

BACKGROUND

A mixed-reality system refers to a system that produces any type of experience that includes virtual content. Such an experience encompasses augmented reality (AR) experiences, augmented virtuality (AV) experiences, and completely virtual experiences. An augmented reality experience adds virtual objects of any kind to a representation of a real world. An augmented virtuality experience adds representations of real objects to an otherwise virtual world. A virtual experience provides a completely immersive virtual world with which a user may interact.

In some cases, a mixed-reality system produces its experience using a head-mounted display (HMD) in cooperation with one or more controllers. For example, the user may manipulate a controller with his or her hand in the course of playing a game. The HMD detects the pose of the user's hand at each moment, and controls the game based on the detected pose.

The technical literature describes different solutions for determining the pose of a controller within an environment. Each such solution has its respective technical limitations, and no single solution is fully satisfactory.

SUMMARY

A technique is described herein for determining a pose of at least one mobile controller within an environment, where the term "pose" as used herein refers to the x, y, and z position of the controller and/or the orientation of the controller. The technique includes: determining that an initiation event has occurred that initiates a process of locating the controller; sending a first instruction to a transmitter in response to the initiation event, which instructs the transmitter to use a first (elevated) power level in emitting a magnetic (M) field and/or electromagnetic (EM) radiation; receiving signals from a receiver in response to the M field and/or EM radiation; determining a pose of the controller within the environment based on the signals that have been received; and sending a second instruction to the transmitter, which instructs the transmitter to emit the M field and/or the EM radiation using a second (normal-use) power level. The first (elevated) power level is higher than the second (normal-use) power level.

In one implementation, a head-mounted display (HMD) uses the above-summarized technique to find a connected controller when the user initially dons the HMD. This is useful because the controller may be effectively invisible to the user who dons the HMD because it is out-of-range with respect to a normal-use operating space of the HMD. Further, the technique performs its locating function without jeopardizing the safety of the user. In other words, the above-summarized technique provides a way of effectively mitigating the range-related limitations of a transmitter/receiver arrangement in a safe manner.

In one implementation, the HMD implements the receiver, while the controller implements the transmitter. In another implementation, the controller implements the receiver, while the HMD implement the transmitter.

In one implementation, the technique ceases transmitting the M field and/or EM radiation at the first power level when the techniques detects that the controller is in motion or is otherwise being handled by the user.

The above-summarized technique can be manifested in various types of systems, devices, components, methods, computer-readable storage media, data structures, mixed-reality presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows a first implementation of the transmitter and the receiver of FIG. 2.

FIG. 7 shows a second implementation of the transmitter and the receiver of FIG. 2.

FIG. 15 is a flowchart that shows one manner of operation of the system of FIG. 1.

FIG. 16 is a flowchart that shows another manner of operation of the system of FIG. 1.

Figure 1:
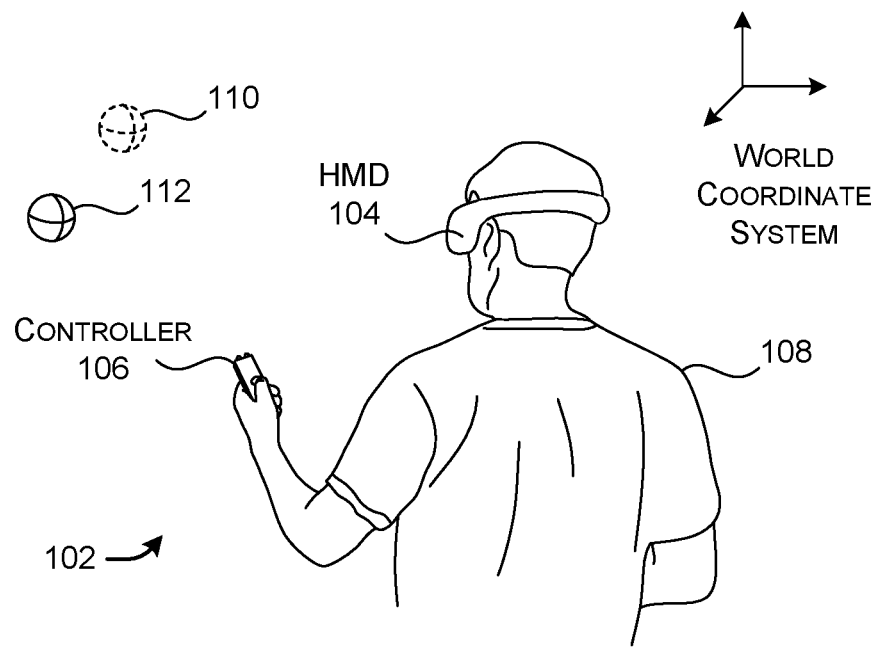
FIG. 1 shows an example of the use of a system that includes a head-mounted display (HMD) and a controller.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a system for locating a controller that is out-of-range with respect to a head-mounted display (HMD) or some other device with which the controller interacts. Section B sets forth illustrative methods which explain the operation of the system of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," "logic," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Mixed-Reality System

A.1. Overview of the System

FIG. 1 shows an example of the use of a mixed-reality system 102 (hereinafter "system") that includes a head-mounted display (HMD) 104 and a controller 106. The HMD 104 corresponds to a headset worn by a user 108 that provides a mixed-reality environment. The term "mixed-reality" environment encompasses at least augmented reality environments, augmented virtuality environments, and entirely virtual environments. In an augmented reality environment, the HMD 104 adds virtual objects (such as virtual object 110) to representations of real-world objects in the physical environment (such as representative real object 112). In an augmented virtuality environment, the HMD 104 adds representations of real-world objects to an otherwise virtual world. In a completely virtual environment, the HMD 104 provides a completely immersive virtual world, e.g., without reference to real-world objects in the physical environment. But in a completely virtual environment, the HMD 104 is still responsive to actions taken by the user 108 within the physical environment.

In one case, the HMD 104 can produce an augmented-reality presentation by projecting virtual objects onto a partially-transparent display device. The user 108 views the physical environment through the partially-transparent display device while the HMD 104 projects virtual objects onto the partially-transparent display device; through this process, the HMD 104 creates the illusion that the virtual objects are integrated with the physical environment. Alternatively, or in addition, the HMD 104 can produce an augmented-reality presentation by generating electronic representations of real-world objects in the physical environment. The HMD 104 then integrates the virtual objects with the electronic versions of the real-world objects, to produce the augmented-reality presentation. The HMD 104 may project that augmented-reality presentation on an opaque display device or a partially-transparent display device.

The controller 106 corresponds to any mechanism that the user 108 manipulates within the environment while interacting with a mixed-reality application. For instance, the controller 106 may correspond to a handheld input device that is designed for interaction with a variety of different kinds of applications. Or the controller 106 may correspond to an application-specific handheld device, such as a device resembling a weapon (e.g., a gun, knife, etc.), a device resembling sporting equipment (e.g., a bat, racket, club, cue, etc.), and so on. Alternatively, or in addition, the controller 106 may correspond to a body-worn device, such as an article of clothing, wrist band, neckless, shoe, pin, etc. These examples are cited by way of illustration, not limitation; other environments can provide a controller having any other shape and/or functionality.

Note that FIG. 1 indicates that the user 108 only interacts with a single controller 106. However, the user 108 may interact with any number of controllers. For example, the user 108 may interact with a mixed-reality world by manipulating two controllers in his or her respective hands. However, to simplify and facilitate explanation, this section will continue to cite the example in which the user 108 manipulates a single controller 106. It should be understood that any of the principles set forth below can be extended to a multi-controller setting.

The HMD 104 includes a tracking component (described below) that determines the pose of the HMD 104 in the physical environment. As used herein, the term "pose" encompasses the x, y, z position of the HMD 104 in the environment and/or the orientation of the HMD 104 in the environment. The tracking component also determines the pose of the controller 106 relative to the HMD 104. The HMD 104 leverages the above-noted pose information to provide an environment-specific mixed-reality experience. For example, the HMD 104 can use the pose of the HMD 104 to determine a portion of a mixed-reality world that the user 108 is presumed to be viewing at a given current time. The HMD 104 includes a scene presentation component to provide a representation of that portion to the user 108. The HMD 104 can use the pose of the controller 106 to determine the manner in which the user 108 is interacting with the mixed-reality world. For instance, the user 108 may use a general-purpose controller to point to a virtual object in the world, a game-specific controller to strike the virtual object, and so on.

The HMD 104 uses a controller interface component (CIC) (described below) which enables the HMD 104 to communicate with the controller 106. As will be described below, in one case, the controller 106 includes a transmitter which emits a magnetic (M) field and/or electromagnetic (EM) radiation, and the CIC includes a receiver for receiving the M field and/or EM radiation, to provide received signals. In another example, the CIC includes the receiver, while the controller 106 includes the transmitter. The tracking component of the HMD 104 identifies the pose of the controller 106 based on the signals received by the receiver.

As a point of clarification, note that the transmitter may emit plural magnetic fields at different frequencies using respective coils aligned along different respective axes. In that case, the term "M field" (in the singular) collectively encompasses all of the component magnetic fields emitted by the transmitter.

In some implementations, the user's view of the real physical environment is completely occluded when he or she dons the HMD 104. For example, any HMD that includes an opaque display device will prevent the user 108 from directly perceiving real objects in the physical environments (although the HMD 104 may still present computer-generated representations of those real objects, if it is capable of observing those real objects via its cameras). Any HMD that includes a see-through display device may allow the user 108 to directly view real objects in the physical environment, although the user's perception of those objects may be partially obscured or otherwise constrained.

Figure 2:
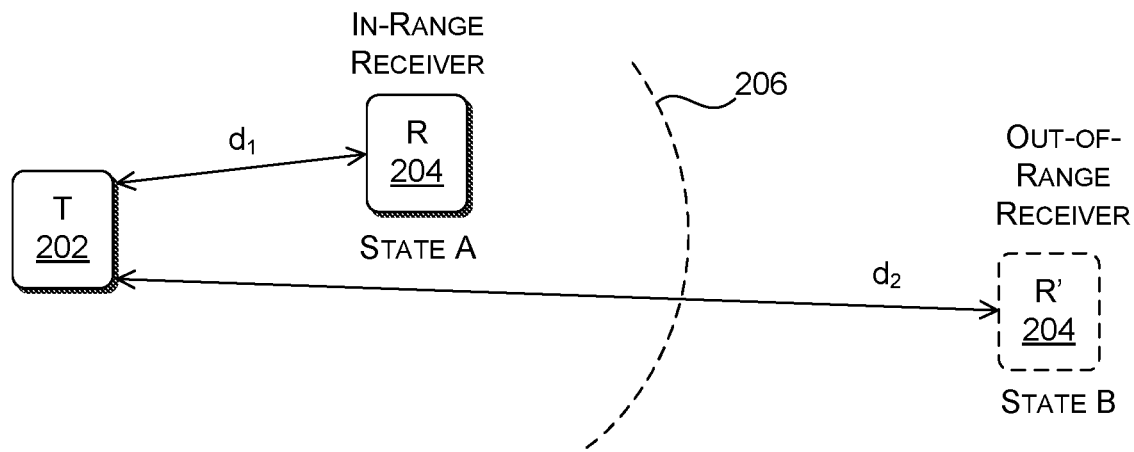
FIG. 2 shows a transmitter which emits a magnetic (M) field and/or electromagnetic (EM) radiation, and a receiver for receiving the M field and/or the EM radiation. The controller of FIG. 1 incorporates the transmitter, while the HMD of FIG. 1 incorporates the receiver, or vice versa.

FIG. 2 shows a transmitter 202 and a receiver 204 employed by the system 102 of FIG. 1. The transmitter 202 emits an M field and/or EM radiation, while the receiver 204 receives the M field and/or EM radiation, to provide received signals. That is, as noted above, the CIC (of the HMD 104) may provide the receiver 204, and the controller 106 may provide the transmitter 202. Or the CIC may provide the transmitter 202, while the controller 106 may provide the receiver 204. In either case, the receiver 204 is capable of reliably detecting the M field and/or EM radiation only when it lies within a normal-use space defined by the dashed-line 206. For example, in one case, the normal-use space may be defined as a sphere surrounding the HMD 104 having a radius of approximately 1.5 meters. This normal-use space generally corresponds to the area within which the user 108 can be expected to manipulate the controller 106 while interacting with the mixed-reality environment, and while wearing the HMD 104. FIG. 2 specifically shows that the receiver 204 is within the normal-use space in state A, and is outside the normal-use space in state B.

The receiver 204 may be unable to reliably detect the M field and/or EM radiation in state B because the signals that it receives become progressively weaker as the distance d from the transmitter 202 increases. That is, the strength of an M field decreases as a function of $1/d^3$, while the strength of EM radiation decreases as a function of $1/d^2$. Outside the normal-use space, the M field and/or EM radiation is too weak to support a reliable measurement, that is, when measured against background noise in the environment. As a point of clarification, FIG. 2 shows a single dashed line 206 that represents a single normal-use space. However, the normal-use space for a system that transmits an M field will generally differ from the normal-use space for a system that transmits EM radiation; this is because the M field decays much more rapidly than EM radiation as a function of distance from the transmitter 202.

The above-noted characteristics of the HMD 104 presents the following problem. The user 108 may begin a mixed-reality session by donning the HMD 104. The user 108 may then attempt to find the controller 106. The HMD 104 can successfully provide a representation of the controller 106 if the controller 106 lies within the normal-use space. This allows the user 108 to successfully reach out and grab the controller 106. But the HMD 104 cannot provide a reliable representation of the controller 106 if it lies outside the normal-use space. This means that, in state B shown in FIG. 2, the controller 106 will effectively be invisible to the user 108, and the HMD 104 can provide no guidance to the user 108 in finding the controller 106.

Figure 3:
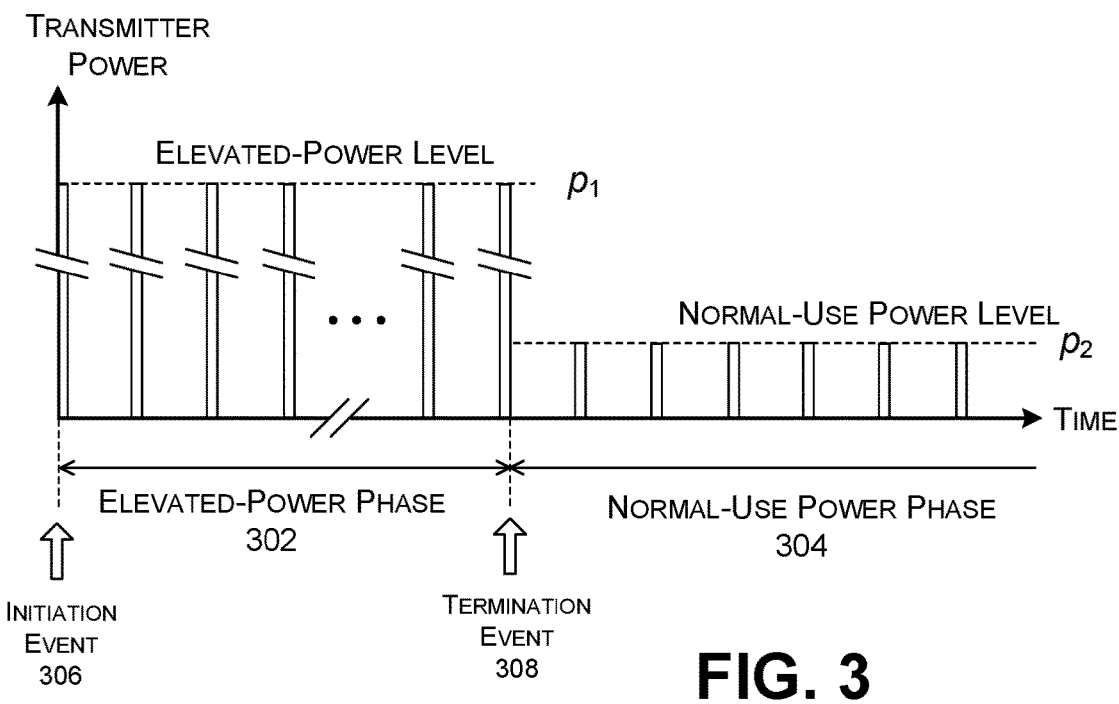
FIG. 3 shows the output power of the transmitter (of FIG. 2) with respect to time.

The system 102 addresses the above-summarized problem through the strategy shown in FIG. 3. The system 102 first instructs the transmitter 202 to transmit the M field and/or EM radiation at an elevated-power level $p_1$ during an elevated-power phase 302. This allows the receiver 204 to reliably detect the M field and/or the EM radiation, to provide received signals. The HMD 104 leverages the received signals to reveal the pose of the controller 106. The presumption is that the user 108 then picks up the controller 208, and thereby brings it into the normal-use space. Thereafter, the system 102 instructs the transmitter 202 to transmit the M field and/or the EM radiation at a normal-use power during a normal-use power phase 304. The receiver 204 then detects the M field and/or EM radiation within the normal-use space 304 at a normal-use power level $p_2$.

In summary, the system 102 temporally boosts the power level of the M field and/or EM radiation, which enables the system 102 to reveal the pose of an out-of-range controller 106. Once the transmitter 202 and the receiver 204 are brought within the normal-use range, the system 102 transmits the M field and/or EM radiation at a normal operating power.

An initiation event 306 triggers the system 102 to commence the elevated-power phase 302, while an optional termination event 308 causes the system 102 to terminate the elevated-power phase 302. The initiation event 306 can correspond to any of: a) a situation in which the user 108 has donned the HMD 104 or otherwise turned on the HMD 104, and in which the HMD 104 determines that the controller 106 is connected to the HMD 104 but cannot be detected by the HMD 104; b) a situation in which the user 108 makes an explicit command to begin the elevated-power phase 302; c) a situation in which the HMD 104 determines that it is not receiving signals from the receiver 204 having sufficient quality, e.g., as assessed with respect to the signal-to-noise ratio (SNR) of the signals, as compared with any environment-specific SNR threshold value, and so on.

With respect to the initiation event (a) identified above, the HMD 104 is said to be connected to the controller 106 when a data channel has been established between the HMD 104 and the controller 106, e.g., via BLUETOOTH or WIFI, etc. As will be described below, that data channel is used to transmit information between the HMD 104 and the controller 106, and is separate from the interaction between the transmitter 202 and the receiver 204. The HMD 104 detects an initiation event in one circumstance when it determines that the data channel is established (and is functional), but the receiver 204 cannot currently detect reliable signals from the transmitter 202.

The termination event 308 may correspond to any of: a) a situation in which an environment-specific time-out period has lapsed, wherein the time-out period begins at the start of the elevated-power phase 302; b) a situation in which there is evidence that the user 108 is handling the controller 106; c) a situation in which the user 108 makes an explicit command to stop the elevated-power phase 302; d) a situation in which the HMD 104 determines that it is now receiving signals from the receiver 204 having sufficient quality, and so on.

In some implementations, the elevated-power level $p_1$ can be k times greater than the normal-use power level $p_2$, where k can correspond to any environment-specific multiplier, such as 2, 3, 4, etc. Further, in some implementations, the system 102 can command the transmitter 202 to transmit the M field and/or EM radiation at a prescribed duty cycle, e.g., such that the transmitter 202 sends flashes of the M field and/or EM radiation having a prescribed environment-specific duration at a prescribed environment-specific periodicity. In one implementation, the system 102 controls the duty cycle of the transmitter 202 during the elevated-power phase 302 such that the average power level at any given time is below a prescribed safety level. This is particularly useful with respect to the transmission of M fields because elevated M fields may pose a health risk to humans. The above-described power-management technique also enables the system 102 to consume its limited power resources (e.g., its battery power) in an efficient manner.

Note that FIG. 3 indicates that the system 102 may invoke the elevated-power phase 302 at the start of a mixed-reality session, e.g., at time t=0. While this is true in many cases, alternatively, or in addition, the system 102 can invoke the elevated-power phase 302 any time at which the controller 106 is moved outside the normal-use space, or is assumed to have been moved outside the normal-use space (but may not have actually been moved outside this space).

Further, FIG. 3 has been described for the case in which the elevated-power level is a first constant power level $p_1$, and the normal-use power level is a second constant power level $p_2$. However, the term "elevated-power level" is more broadly to be construed as any power level in a range of elevated-power levels, and the term "normal-use power level" is more broadly to be construed as any power level in a range of normal-use power levels.

For instance, consider the following alternative manner of operation. Upon detecting an initiation event 306, the system 102 instructs the transmitter 202 to beginning transmitting an M field and/or EM radiation at an initial elevated-power level. Assume that the system 102 is able to detect the controller 106 at this elevated-power level. The system 102 can then instruct the transmitter 202 to progressively decrease the power level until it reaches a minimally sufficient power level. A minimally sufficient power level is a power level that is sufficient for the receiver 204 to detect the M field and/or EM radiation at any given time, but would not be sufficient if it were decreased any further. The system 102 determines the minimally sufficient power level at a given time by lowering the power level until the receiver 204 does not receive reliable signals, and then choosing the power level that is a prescribed environment-specific power increment Δp above this level. The system 102 can alternatively achieve the same result by progressively increasing an initial elevated-power level until the receiver 204 is able to detect the controller 106, which defines the minimally sufficient power level.

Assume that the HMD 104 displays the location of the controller 106 to the user 108. In response, assume that the user 108 begins walking towards the controller 106, while wearing the HMD 104, with the objective of picking it up. The system 102 can instruct the transmitter 202 to adjust the power level while the user 108 walks so that it remains at a minimally sufficient level. This will cause the transmitter 204 to progressively lower its power level as the user 108 walks closer to the controller 106.

When the user 108 reaches the boundary of the normal-use space, the system 102 will instruct the transmitter 202 to begin transmitting the M field and/or the EM radiation at a normal-use power level. In addition, the system 102 can continue to vary the power level within the normal-use space such that it continues to be minimally sufficient.

FIG. 3 could be modified to describe the above-described scenario by showing an elevated-power phase that starts at an initial elevated-power level and thereafter decreases to a normal-use power level (which is achieved when the user 108 reaches the normal-use space). The normal-use power level may then vary within the normal-use phase 304. The above-described manner of operation has at least two advantages. First, it helps protect the safety of the user 108 as the user 108 approaches an out-of-range controller 106 by progressively lowering the power level of the transmitter 202. Second, it consumes battery power in an efficient manner.

Nevertheless, to facilitate explanation, the remainder of the explanation will emphasize the case in which the system 102 transitions between two discrete power levels. But again, the principles described herein are applicable to the case in which the elevated-power level refers to any power level in a range of elevated-power levels, and/or the normal-use power level refers to any power level in a range of normal-use power levels.

In yet another variation, in certain circumstances, the system 102 can instruct the transmitter 202 to completely stop transmitting the M field and/or EM radiation after the termination event 308, e.g., by reducing the power level to zero. For instance, the system 102 can instruct the transmitter 202 to stop transmitting when a timeout period has been reached without the system 102 having detected the controller 106. The system 102 can also shut off the transmitter 202 when the user 108 issues an explicit command to stop the elevated-power phase 302, without the system 102 having detected the controller 106.

Figure 4:
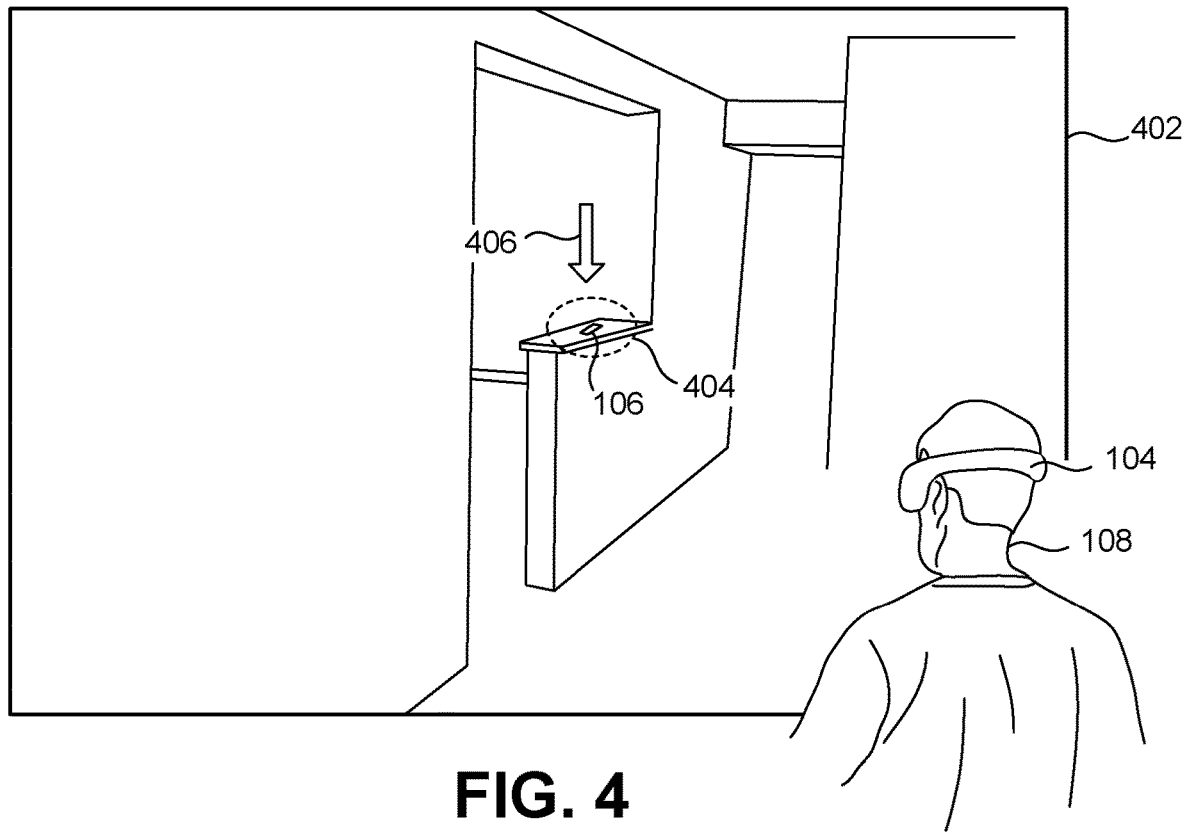
FIG. 4 shows an example of an output presentation produced by the system of FIG. 1. The output presentation highlights the pose of an out-of-range controller.

FIG. 4 shows an output presentation 402 that the scene presentation component (of the HMD 104) can present to the user 108 based on the signals received by the transmitter 202 during the elevated-power phase 302. Assume that, in this scenario, the user 108 dons the HMD 104 while a connected controller 106 is out-of-range with respect to the HMD 104, and therefore the controller 106 is effectively invisible to the user 108. For instance, the controller 106 is sitting on a countertop several meters from the HMD 104 at the time that the user 108 dons the HMD 104.

The scene presentation component can highlight the pose of the controller 106 in any application-specific way. For example, the scene presentation component can generate and display an electronic representation of the controller 106, e.g., by modeling and displaying the visible surfaces of the controller 106. Alternatively, or in addition, the scene presentation component can display one or more markers which reveal the pose of the controller 106. For example, without limitation, the scene presentation component can present a glowing aura 404 around the controller, or present an arrow 406 that points to the controller 106, etc. Any such revelation of the location of the controller 106 is referred to herein as an indicator. Alternatively, or in addition, the scene presentation component can present spoken instructions to user 108 which reveal the pose of the HMD 104, e.g., by giving the instruction, "The controller is 4 meters in front of you, at about 2 o'clock." The user 108 may respond to the instructions by walking over to the controller 106 and picking it up while wearing the HMD 104. Or the user 108 may remove the HMD 104 and walk over to the controller 106.

A.2. Overview of the Head-Mounted Display (HMD)

Figure 5:
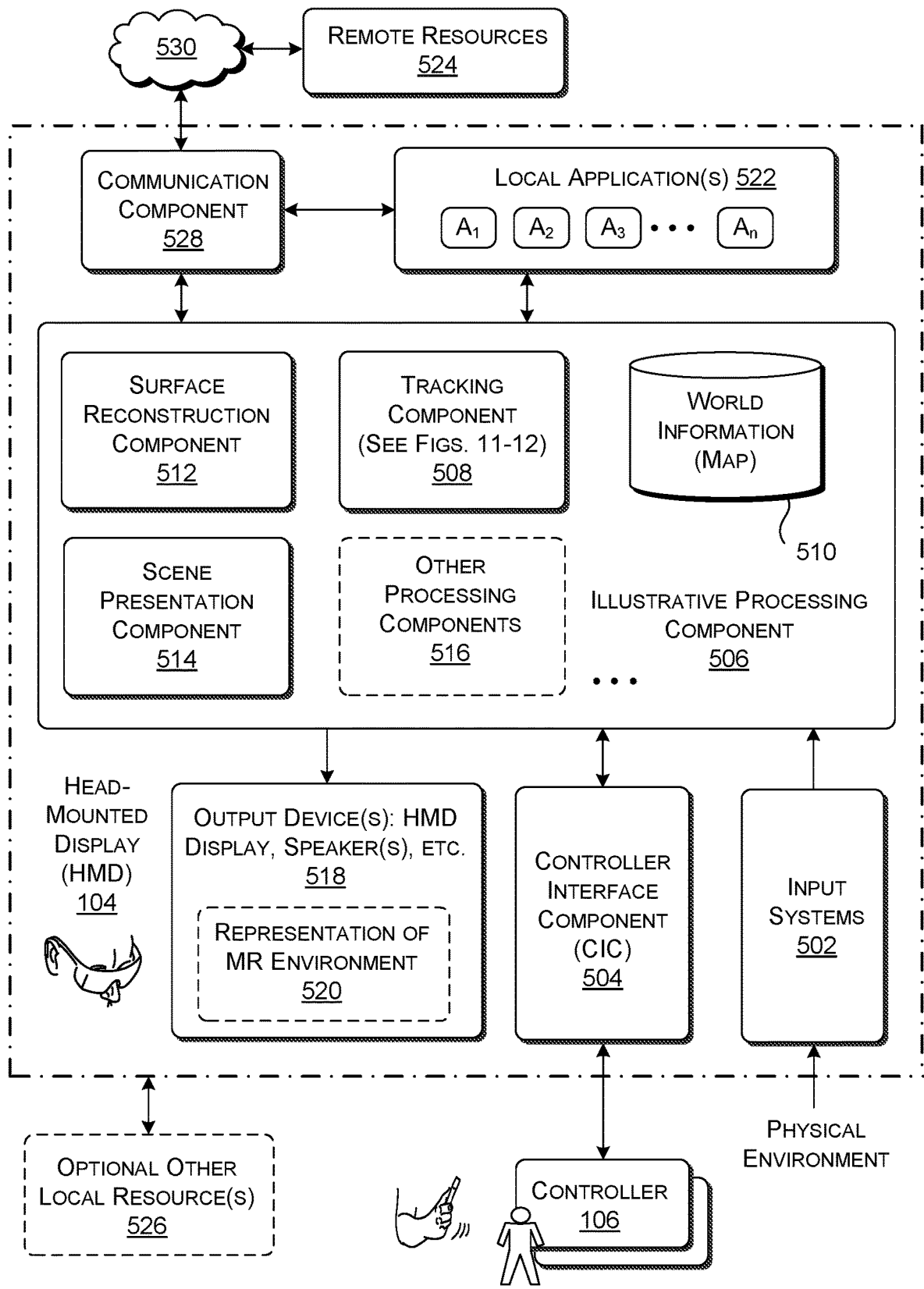
FIG. 5 shows one implementation of the HMD of FIG. 1.

FIG. 5 shows a more detailed depiction of the head-mounted display (HMD) 104 introduced in Subsection A.1. The HMD 104 and the controller 106 work in conjunction to provide a mixed-reality experience, which, as noted above, may correspond to an augmented-reality experience, an entirely virtual experience, etc. The following explanation will continue to make reference to the non-limiting case in which the user manipulates a single controller 106; but as noted above, the user can alternatively interact with two or more controllers.

The HMD 104 includes a collection of input systems 502 for interacting with a physical environment. The input systems 502 can include, but are not limited to: one or more environment-facing video cameras; an environment-facing depth camera system; a gaze-tracking system; an inertial measurement unit (IMU); one or more microphones; a speech recognition system, etc.

Each video camera may produce red-green-blue (RGB) image information and/or monochrome grayscale information. The depth camera system produces depth image information based on image information provided by the video cameras. Each pixel of the depth image information represents a distance between a reference point associated with the HMD 104 and a point in the physical environment. The depth camera system can use any technology to measure the depth of points in the physical environment, including a time-of-flight technique, a structured light technique, a stereoscopic technique, etc., or any combination thereof.

In one implementation, the IMU can determine the movement of the HMD 104 in six degrees of freedom. The IMU can include one or more accelerometers, one or more gyroscopes, one or more magnetometers, etc., or any combination thereof.

The gaze-tracking system can determine the position of the user's eyes and/or head. The gaze-tracking system can determine the position of the user's eyes, by projecting light onto the user's eyes, and measuring the resultant glints that are reflected from the user's eyes. Illustrative information regarding the general topic of eye-tracking can be found, for instance, in U.S. Patent Application No. 20140375789 to Lou, et al., published on Dec. 25, 2014, entitled "Eye-Tracking System for Head-Mounted Display." The gaze-tracking system can determine the position of the user's head based on IMU information supplied by the IMU.

The speech recognition system can receive and analyze voice signals provided by the microphone(s), e.g., using a neural network. The HMD 104 can leverage the speech recognition system to interpret commands spoken by the user.

A controller interface component (CIC) 504 handles interaction with the controller 106. Subsection A.3 (below) provides further details regarding illustrative implementations of the CIC 504. By way of overview, the CIC 504 can emit and/or receive an M field and/or EM radiation. The controller 106 can perform a complementary function of receiving and/or emitting the M field and/or EM radiation. The CIC 504 can also send and/or receive information-bearing signals to/from the controller 106, as described in more detail below.

A collection of processing components 506 process the input information provided by the input systems 502 and the CIC 504, to provide a mixed-reality experience. For instance, a tracking component 508 determines the pose of the HMD 104 in the physical environment, corresponding to its x, y, and z position, and its orientation. In one implementation, the tracking component 508 can determine the pose of the HMD 104 using Simultaneous Localization and Mapping (SLAM) technology. The SLAM technology progressively builds a map of the physical environment. Further, at each instance, the SLAM technology determinates the pose of the HMD 104 with respect to the map in its current state. A data store 510 stores the map in its current state. The map is also referred to herein as map information or world information. In addition, the tracking component 508 determines the pose of the controller 106 relative to the HMD 104. Subsection A.4 provides additional information regarding one implementation of the tracking component 508.

A surface reconstruction component 512 identifies surfaces in the mixed-reality environment based, in part, on input information provided by the input systems 502. The surface reconstruction component 512 can then add surface information regarding the identified surfaces to the world information provided in the data store 510. Subsection A.4 provides additional information regarding one implementation of the surface reconstruction component 512.

A scene presentation component 514 can use graphics pipeline technology to produce a three-dimensional (or two-dimensional) representation of the mixed-reality environment. The scene presentation component 514 generates the representation based at least on virtual content provided by an invoked application, together with the world information in the data store 510. The graphics pipeline technology can include vertex processing, texture processing, object clipping processing, lighting processing, rasterization, etc. Overall, the graphics pipeline technology can represent surfaces in a scene using meshes of connected triangles or other geometric primitives. The scene presentation component 514 can also produce images for presentation to the left and rights eyes of the user, to produce the illusion of depth based on the principle of stereopsis. Subsection A.4 provides additional information regarding one implementation of the scene presentation component 514.

The collection of processing components 506 can also include other processing resources 516. For example, the other processing resources 516 can include functionality for interpreting gestures made by the user, etc.

One or more output devices 518 provide a representation 520 of the mixed-reality (MR) environment. The output devices 518 can include any combination of display devices, such as a liquid crystal display panel, an organic light emitting diode panel (OLED), a digital light projector, etc. More generally, in one implementation, the output devices 518 can include a semi-transparent display mechanism. That mechanism provides a display surface on which virtual objects may be presented, while simultaneously allowing the user to view the physical environment "behind" the display surface. The user perceives the virtual objects as being overlaid on the physical environment and integrated with the physical environment. In another implementation, the output devices 518 include an opaque (non-see-through) display mechanism for providing a fully immersive virtual display experience.

The output devices 518 may also include one or more speakers. The speakers can provide known techniques (e.g., using a head-related transfer function (HRTF)) to provide directional sound information, which the user perceives as originating from a particular pose within the physical environment.

The HMD 104 can include a collection of local applications 522, stored in a local data store. Each local application can perform any function. For example, an illustrative application can provide a game experience.

Note that FIG. 5 indicates that the above-described components are housed within a single physical unit associated with the HMD 104. While this represents one viable implementation of the HMD 104, in other cases, any of the functions described above can alternatively, or in addition, be implemented by one or more remote resources 524 and/or one or more local resources 526. Similarly, any of the information described above can alternatively, or in addition, be stored by the remote resources 524 and/or the local resources 526. The remote resources 524 may correspond to one or more remote servers and/or other remote processing devices. The local resources 526 may correspond to one or more processing devices that are located within the same physical environment as the HMD 104. For example, a local processing device may correspond to a device that the user fastens to his or her belt. In view of the above, what is referred to herein as the HMD 104 may encompass processing components distributed over any number of physical processing devices.

A communication component 528 allows the HMD 104 to interact with the remote resources 524 via a computer network 530. The communication component 528 may correspond to a network card or other suitable communication interface mechanism. The computer network 530 can correspond to a local area network, a wide area network (e.g., the Internet), one or more point-to-point links, etc., or any combination thereof. The HMD 104 can interact with the optional local resources 526 through any communication mechanism, such as BLUETOOTH, WIFI, a hardwired connection, etc.

A.3. HMD/Controller Interaction Strategies

FIG. 6 shows a first implementation of the transmitter 202 and the receiver 204 introduced in FIG. 2. In this implementation, the transmitter 202 is a magnetic field transmitter for emitting a magnetic (M) field, and the receiver 204 is a magnetic field receiver for receiving the magnetic field, to produce received signals. FIG. 6 indicates that the controller 106 provides the transmitter 202, while the HMD 104 provides the receiver 204. But in another case, the controller 106 can provide the receiver 204 and the HMD 104 can provide the transmitter 202.

In one implementation, the transmitter 202, also referred to as a magnetic field generator, includes plural conductive coils (e.g., coils 602, 604, 606, etc.) aligned with respective different axes. The transmitter 202 uses a driver 608 to drive the coils (602, 604, 606, etc.) at different respective frequencies, to produce a collection of magnetic fields. The receiver 204 likewise includes plural conductive coils (e.g., coils 610, 612, 614, etc.) aligned with respective different axes. The receiver 204 uses its coils (610, 612, 614, etc.) to detect the magnetic fields produced by the transmitter 202, to provide received signals. A signal collection component 616 collects the received signals, e.g., using a signal-sampling circuit. More specifically, the receiver 204 can discriminate the coil-specific (and axis-specific) origin of any detected magnetic field based on its telltale frequency. The tracking component 508 determines the pose of the controller 106 relative to the HMD 104 based on signals received by the receiver 204.

FIG. 7 shows a second implementation of the transmitter 202 and the receiver 204 introduced in FIG. 2. In this implementation, the transmitter 202 is an optical transmitter for emitting electromagnetic (EM) radiation associated with any portion(s) of the spectrum, such as visible light, infrared, etc. The receiver 204 is an optical receiver for receiving the EM radiation, to produce received signals. FIG. 7 indicates that the controller 106 provides the transmitter 202, while the HMD 104 provides the receiver 204. But in another case, the controller 106 can provide the receiver 204 and the HMD 104 can provide the transmitter 202.

In one implementation, the transmitter 202 of FIG. 7 corresponds to a plurality of light-emitting elements (e.g., elements 702), together with a driver 704 that drives the light-emitting elements. For example, the light-emitting elements may correspond to light-emitting or infrared-emitting light-emitting diodes (LEDs), etc.

Without limitation, the overall controller 106 shown in FIG. 7 includes an elongate shaft 706 that the user grips in his or her hand during normal use. The controller 106 further includes a set of input mechanisms 708 that the user may actuate while interacting with a modified-reality environment. This particular controller 106 also includes a ring 710 having the light-emitting elements (e.g., elements 702) dispersed over its surface.

The receiver 204 of FIG. 7 includes a camera system that includes one or more video cameras, such as monochrome camera 712 and monochrome camera 714. The camera system captures a representation of the light-emitting elements at a particular instance of time, to provide received signals. The tracking component 508 determines the pose of the controller 106 relative to the HMD 104 based on the received signals.

As will be described in greater detail below with reference to FIG. 10, the controller 106 itself can also optionally include one or more local cameras 716 for capturing image information from the vantage point of the controller 106. Although not shown, the controller 106 can also include a local SLAM component for tracking the pose of the controller 106 based on the image information provided by the local cameras 716.

In other implementations, the system 102 can combine two or more mechanisms for determining the pose of the controller 106, such as the mechanism of FIG. 6 and the mechanism of FIG. 7.

Figure 8:
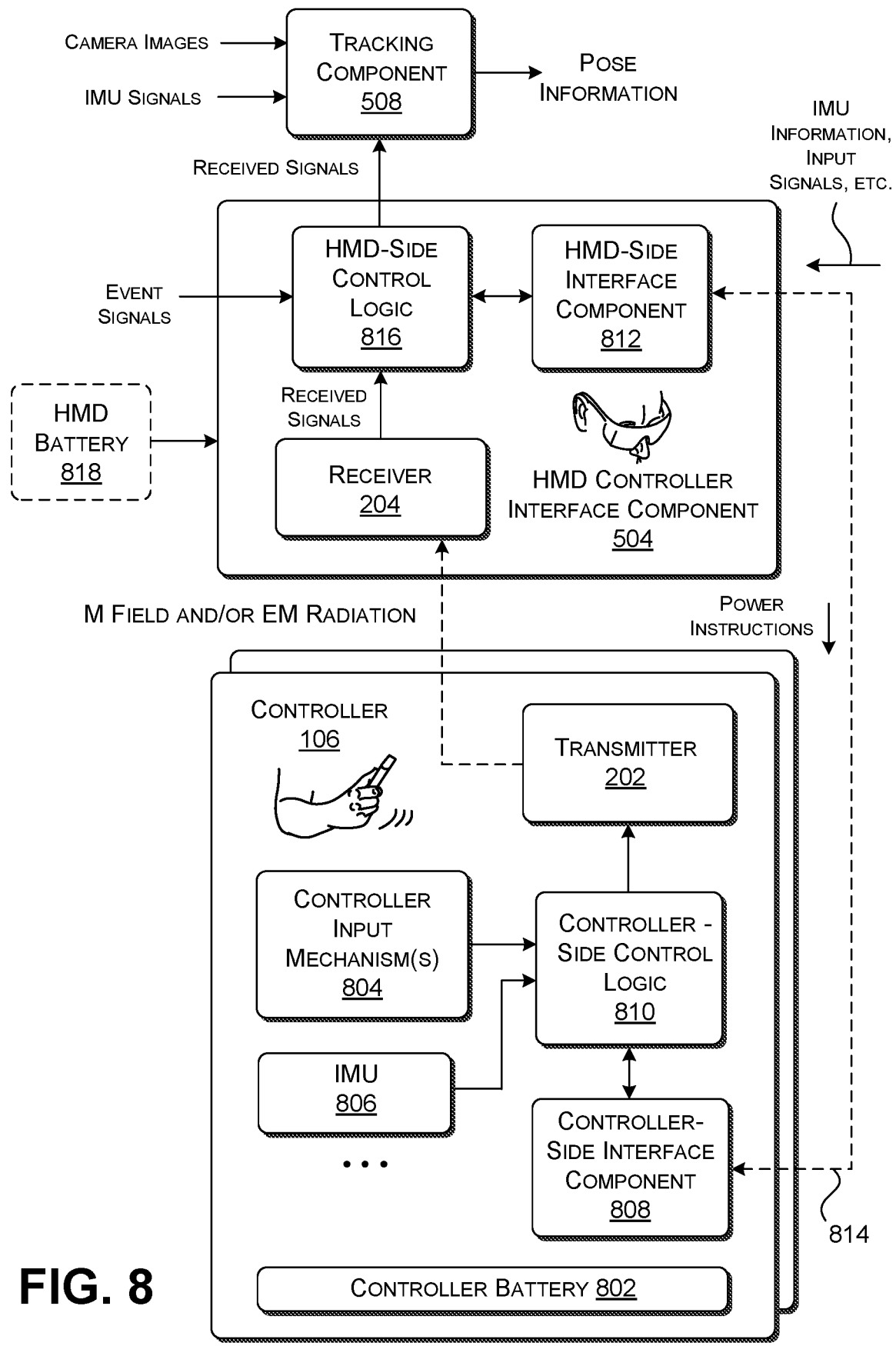
FIG. 8 shows a first implementation of a controller interface component (CIC) for use in the HMD of FIG. 5, in conjunction with a controller.

FIG. 8 shows a first implementation of the CIC 504 (which is a component of the HMD 104) and the controller 106. In this implementation, the controller 106 implements the transmitter 202, while the HMD 104 implements the receiver 204. The transmitter 202 and receiver 204 can correspond to the magnetic field transmitter and the magnetic field receiver shown in FIG. 6, or the optical transmitter and the optical receiver shown in FIG. 7, or some other implementation of the transmitter and receiver. In view thereof, the transmitter 202 and the receiver 204 will be described in a high-level manner below.

Referring first to the controller 106, this component includes the transmitter 202, a controller battery 802 for powering the controller 106, and one or more controller input mechanisms 804 for manipulation by the user. In the example of FIG. 7, the controller input mechanisms 804 correspond to the collection of illustrated buttons (e.g., the input mechanisms 708). The controller 106 also includes an IMU 806 for determining the movement of the controller 106 in six degrees of freedom. The IMU 806 can include one or more accelerometers, one or more gyroscopes, one or more magnetometers, etc., or any combination thereof. Although not shown in FIG. 8, the controller 106 can optionally include one or more touch sensors that detect when the user is handling the controller 106. Collectively, the IMU 806 and the touch sensor(s) constitute handling-sensing devices that provide handling signals that indicate whether or not the user is handling the controller 106. A controller-side interface component 808 enables the controller 106 to exchange information with the CIC 504. The controller-side interface component 808 can perform this interaction using any communication technology(ies), such as BLUETOOTH, WIFI, a hardwired connection, etc., or any combination thereof. Controller-side control logic 810 governs the operation of the controller 106. For example, the controller-side control logic 810 may correspond to a processing unit which executes machine-readable instructions, or an application specific integrated circuit or the like.

The CIC 504 of the HMD 104 includes the receiver 204 and an HMD-side interface component 812. The HMD-side interface component 812 interacts with the complementary controller-side interface component 808 using any communication technology described above. Collectively, the HMD-side interface component 812 and the controller-side interface component 808 define a communication path 814, also referred to herein as a data channel. HMD-side control logic 816 governs the operation of the CIC 504. For instance, the HMD-side control logic 816 may correspond to a processing unit provided by the HMD 104 that executes machine-readable instructions, or an application specific integrated circuit or the like. An HMD battery 818 powers the control interface system 504.

In operation, the HMD-side control logic 816 sends an instruction to the controller 106 which commands the controller 106 to commence transmitting an M field and/or EM radiation at the enhanced power level $p_1$. The HMD-side control logic 816 can send this instruction via the communication path 814. For example, that communication path 814 may correspond to a BLUETOOTH communication path. The receiver 204 of the control interface system 504 receives the M field and/or EM radiation emitted by the transmitter 202, to provide received signals. The receiver 204 forwards the received signals to the tracking component 508. Upon a termination event or some other evidence that the user has brought the controller 106 within the normal-use space, the HMD-side control logic 816 transmits a second instruction to the controller 106 via the communication path 814, commanding the controller 106 to begin transmitting the M field and/or the EM radiation at the normal-use power level $p_2$.

In other implementations, the HMD-side control logic 816 dynamically adjusts the power level of the transmitter 202 so that it is set at a minimally sufficient level at any given time (or at least an attempt is made to achieve this performance). The HMD-side control logic 816 can also shut off the transmitter 202 in certain circumstances. Details of these implementations were provided above in Subsection A.1.

The CIC 504 and the controller 106 can also perform other functions. For example, the controller 106 can forward IMU information provided by its local IMU 806 to the CIC 504 via the communication path 814. Similarly, the controller 106 can forward input signals provided by its input mechanisms 804 to the CIC 504 through the same communication path 814.

Figure 9:
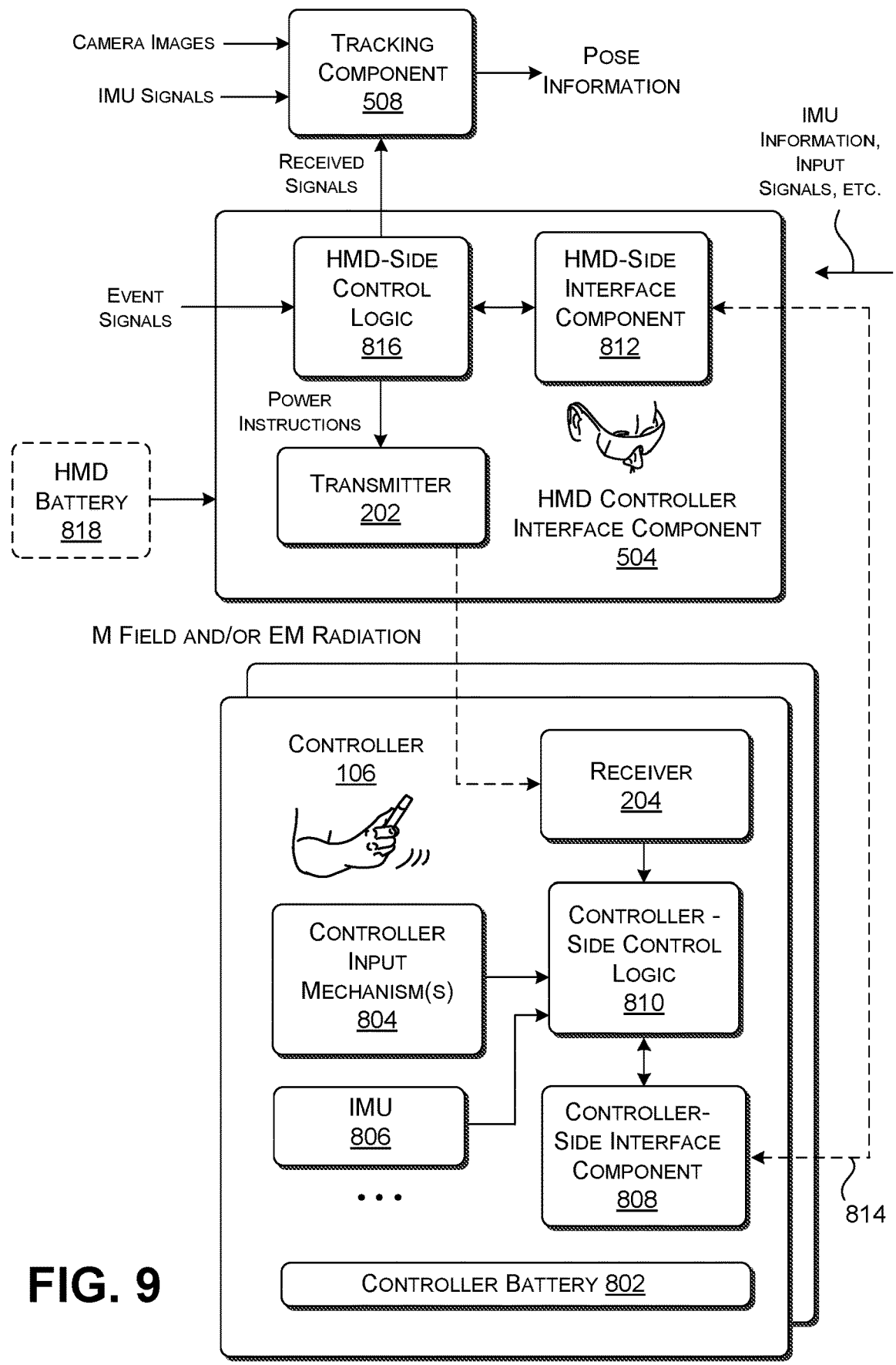
FIG. 9 shows a second implementation of the CIC and the controller.

FIG. 9 shows a second implementation of the CIC 504 and the controller 106. The second implementation includes the same components as the first implementation of FIG. 8, with the exception that, in FIG. 9, the CIC 504 implements the transmitter 202, while the controller 106 implements the receiver 204.

In operation, the HMD-side control logic 816 sends an instruction to the transmitter 202, which commands the transmitter 202 to commence transmitting an M field and/or EM radiation at the enhanced power level $p_1$. The receiver 204 of the controller 106 receives the M field and/or EM radiation emitted by the transmitter 202, to provide received signals. The controller-side control logic 810 can send the received signals to the CIC 504 of the HMD 104 via the communication path 814. Thereafter, the HMD-side control logic 816 forwards the received signals to the tracking component 508. Upon a termination event or other indication that the user has moved into the normal-use space, the HMD-side control logic 816 transmits a second instruction to the transmitter 202, commanding the transmitter 202 to begin transmitting the M field and/or the EM radiation at the normal-use power level $p_2$. Again, the implementation of FIG. 9 can also operate in the scenario in which the HMD-side control logic 816 varies the power level to attempt to achieve a minimally sufficient power level at all times.

In yet another implementation (not shown), another device within the physical environment can implement the transmitter 202, besides the HMD 104 or the controller 106. For example, a wall-mounted device having a fixed position and orientation within the physical environment can implement a magnetic field transmitter for emitting a magnetic field. The controller 106, which implements the receiver 204, receives signals in response to detecting the magnetic field. The controller 106 can send the received signals to the HMD 104, which uses the signals to determine the pose of the controller 106. In this case, the magnetic field is stationary and is known a priori by the HMD 104.

The implementation of FIG. 9 can adopt additional safety measures compared to the implementation of FIG. 8. These safety measures take into account the fact that the user is physically closer to the transmitter 202 in the case of FIG. 9 compared to the case of FIG. 8. According to one safety measure, the HMD-side control logic 816 can instruct the transmitter 202 to transmit the M field and/or the EM radiation at a lower peak elevated power level compared to the case of FIG. 8, and/or a lower average power level compared to the case of FIG. 8. A lower average power level can be achieved, in part, by decreasing the duty cycle of the electromagnetic pulses compared to the case of FIG. 8. In addition, or alternatively, the HMD 104 can include electromagnetic shielding that reduces the intensity of the M field and/or EM radiation that reaches the user's body. In addition, or alternatively, the HMD 104 can incorporate one or more sensors that detect the level of the M field and/or EM radiation that is emitted from the HMD 104, to provide sensor readings; the HMD 104 can vary its emissions in accordance with these sensor readings such that the level of the received M field and/or EM radiation remains within safe levels. Other sensors can be provided at other locations on the user's body.

Figure 10:
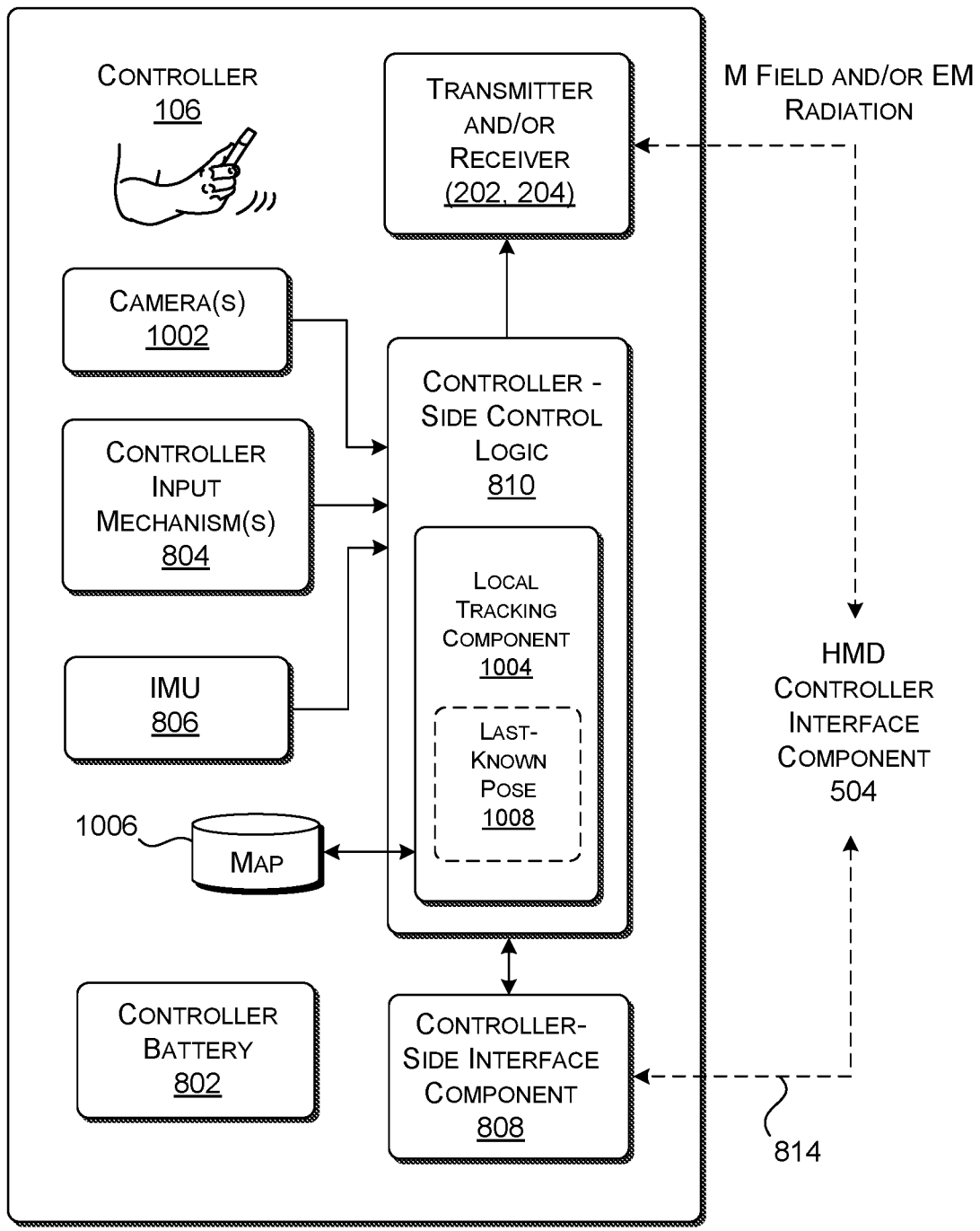
FIG. 10 shows another implementation of a controller.

FIG. 10 shows a variation of the controller 106 shown in FIGS. 8 and 9. In some implementations, the controller 106 of FIG. 10 includes the transmitter 202, per the case of FIG. 8. In other implementations, the controller 106 includes the receiver 204, per the case of FIG. 9. The controller 106 varies from the examples of FIGS. 8 and 9 by including one or more local video cameras 1002. Further, the controller-side control logic 810 includes a local tracking component 1004.

In operation, the local tracking component 1004 receives image information from the local cameras 1002. Based on this information (optionally together with IMU information from the local IMU 806), the local tracking component 1004 determines the pose of the controller 106 within the environment. The local tracking component 1004 can perform this operation using SLAM technology, described in greater detail below. That is, the local tracking component 1004 produces a map of the physical environment, which it stores in a local data store 1006. The local tracking component 1004 then uses the SLAM technology to determine the pose of the controller 106 with reference to the map stored in the data store 1006.

In other words, the local tracking component 1004 performs the same function described above with respect to the HMD-side tracking component 508. That is, whereas the HMD-side tracking component 508 determines the pose of the HMD 104 based on the HMD's cameras, the local tracking component 1004 determines the pose of the controller 106 based on the local cameras 1002. The controller-side interface component 808 can send pose information that describes the pose of the controller 106 to the CIC 504 via the communication path 814 (e.g., via a BLUETOOTH communication path, etc.).

In a variation of the above manner of operation, the local tracking component 1004 can receive a map produced by the HMD-side tracking component 508 via the communication path 814. The local tracking component 1004 can then forego the map-building phase of the SLAM processing. That is, the local tracking component 1004 determines the pose of the controller 106 with reference to the map provided by the HMD-side tracking component 508, which eliminates the need for the controller 106 to generate the map itself.

The system 102 can utilize the local tracking component 1004 in different ways. In one manner of operation, the system 102 can use the pose information provided by the local tracking component 1004 to determine the pose of the controller 106, instead of using the HMD-side tracking component 508 to perform the same task. In this case, the system 102 can shut down the operation of the transmitter 202 and the receiver 204. In another manner of operation, the system 102 uses both instances of pose information (provided by the local tracking component 1004 and the HMD-side tracking component 508) to determine the pose of the controller 106, e.g., by using both instances of pose information to increase the confidence at which the pose of the controller 106 is detected.

Alternatively, or in addition, the system 102 can leverage the local tracking component 1004 to help find an out-of-range controller 106. In this implementation, at each instance, the local tracking component 1004 stores the last-known pose 1008 of the controller 106 in a data store. Upon startup, the local tracking component 1004 analyzes the image information collected by the local cameras 1002 to determine whether it matches the last image information collected by the local cameras 1002 immediately before the controller 106 was set down or otherwise shut off. If there is agreement, this conclusion would suggest that the controller 106 has not been moved while it was not in use. And if so, the local tracking component 1004 can forward the last-known pose 1008 to the CIC 504 via the communication path 814. The HMD 104 can use the last-known pose 1008 to highlight the presumed pose of the controller 106. By doing so, the system 102 can forego reliance on the transmitter 202 and the receiver 204 to find the controller 106. Or the system 102 can continue to rely on the transmitter/receiver (202, 204) to increase the confidence at which it detects the pose of the controller 102.

On the other hand, assume that the local tracking component 1004 determines the image information collected by the local cameras 1002 upon startup does not match the last image information collected by the local cameras 1002 before the controller 106 was set down or otherwise shut off. This suggests that the controller 106 has been moved to a new location. Note that the local tracking component 1004 needs to collect features as the controller 106 is moved through the physical environment before the local tracking component 1004 can provide a reliable determination of the controller's pose. As such, the local tracking component 1004 will be unable to determine the new pose of the controller 104 if it has been moved, but it is now stationary. If this is the situation, the system 102 can use the strategy described with respect to FIG. 8 or FIG. 9 to find the controller 106, e.g., by determining the pose of the controller 106 using the transmitter 202 and the receiver 204.

The local tracking component 1004 can alternatively, or in addition, base its decision regarding whether the controller 106 has been moved (while not in normal use) based on other evidence, such as movement signals (from the controller's IMU 806), touch signals (from a touch sensor), etc.

A.4. Illustrative HMD Components

This subsection provides further illustrative details regarding the components of the HMD 104 introduced in FIG. 5. Starting with FIG. 11, this figure shows one implementation of the HMD-side tracking component 508 and the scene presentation component 514. The HMD-side tracking component 124 includes an HMD SLAM component 1102 for determining the pose of the HMD 104 using SLAM technology. It performs this task based on image information provided by the HMD-side video cameras 1104 (such as two or more monochrome cameras), together with IMU information provided by the HMD-side IMU 1106. The input systems 502 (of FIG. 5) encompass the HMD-side cameras 1104 and the HMU-side IMU 1106. The operation of the HMD SLAM component 1102 will be described below with reference to FIG. 12.

The HMD-side tracking component 508 also includes a controller pose determination component (CPDC) 1108. The CPDC 1108 determines the pose of the controller 106 relative to the HMD 104 based on the signals provided by the CIC 504. It stores the pose of the controller 106 in a data store 1110.

The scene presentation component 514 provides a representation of a mixed-reality environment on the HMD's display device 1112. The scene presentation component 514 includes a controller identifier component 1114 that highlights the pose of the controller 106 based on the information stored in the data store 1110. For example, the controller identifier component 1114 can perform this operation by using known graphics techniques to present a representation of the controller 106 using a glow effect. Alternatively, the controller identifier component 1114 can use known graphics techniques to display a marker in proximity to a representation of the controller 106 within the scene. For instance, the marker can correspond to the arrow 406 shown in FIG. 4.

Figure 12:
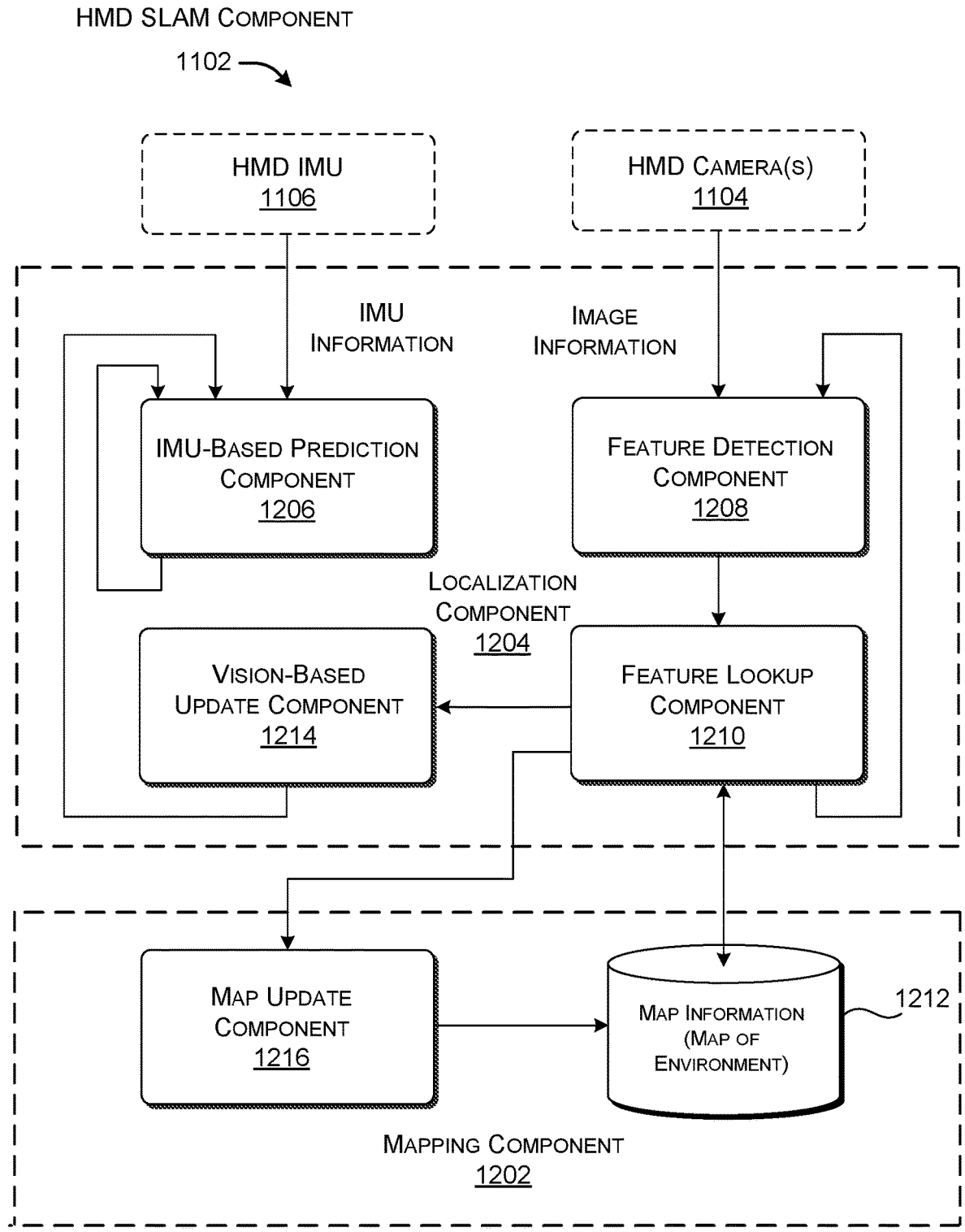
FIG. 12 shows one implementation of a Simultaneous Location and Mapping (SLAM) component, which is an element of the tracking component of FIG. 11.

FIG. 12 shows one implementation of the HMD Simultaneous Location and Mapping (SLAM) component 1102 for use in determining the pose of the HMD 104. In some cases, HMD SLAM component 1102 includes a map-building component 1202 and a localization component 1204. The map-building component 1202 builds map information that represents the physical environment, while the localization component 1204 tracks the pose of the HMD 104 with respect to the map information (referred to as a "map" above). The map-building component 1202 operates on the basis of image information provided by the HMD-side cameras 1104. The localization component 1204 operates on the basis of the image information provided by the HMD-side cameras 1104 and IMU information provided by the HMD-side IMU 1106.

More specifically, beginning with the localization component 1204, an IMU-based prediction component 1206 predicts the pose of the HMD 104 based on a last estimate of the pose in conjunction with the movement information provided by the HMU-side IMU 1106. For instance, the IMU-based prediction component 1206 can integrate the movement information provided by the HMU-side IMU 1106 since the pose was last computed, to provide a movement delta value. The movement delta value reflects a change in the pose of the HMD 104 since the pose was last computed. The IMU-based prediction component 1206 can add this movement delta value to the last estimate of the pose, to thereby update the pose.

A feature detection component 1208 determines features in the image information provided by the HMD-side cameras 1104. For example, the feature detection component 1208 can use any kind of image operation to perform this task. For instance, the feature detection component 1208 can use a Scale-Invariant Feature Transform (SIFT) operator. A feature lookup component 1210 determines whether the features identified by the feature detection component 1208 match any previously stored features in the current map information (as provided in a data store 1212).

A vision-based update component 1214 updates the pose of the HMD 104 on the basis of any features discovered by the feature lookup component 1210. In one approach, the vision-based update component 1214 can determine the presumed pose of the HMD 104 through triangulation or some other position-determining technique. The vision-based update component 1214 performs this operation based on the known locations of two or more detected features in the image information. A location of a detected feature is known when that feature has been detected on a prior occasion, and the estimated location of that feature has been stored in the data store 1212.

In one mode of operation, the IMU-based prediction component 1206 operates at a first rate, while the vision-based update component 1214 operates at a second rate, where the first rate is greater than the second rate. The localization component 1204 can opt to operate in this mode because the computations performed by the IMU-based prediction component 1206 are significantly less complex than the operations performed by the vision-based update component 1214 (and the associated feature detection component 1208 and feature lookup component 1210). But the predictions generated by the IMU-based prediction component 1206 are more susceptible to error and drift compared to the estimates of the vision-based update component 1214. Hence, the processing performed by the vision-based update component 1214 serves as a correction to the less complex computations performed by the IMU-based prediction component 1206.

Now referring to the map-building component 1202, a map update component 1216 adds a new feature to the map information (in the data store 1212) when the feature lookup component 1210 determines that a feature has been detected that has no matching counterpart in the map information. In one non-limiting implementation, the map update component 1216 can store each feature as an image patch, e.g., corresponding to that portion of an input image that contains the feature. The map update component 1216 can also store the position of the feature, with respect to the world coordinate system.

In one implementation, the localization component 1204 and the map-building component 1202 can use an Extended Kalman Filter (EFK) to perform the SLAM operations. An EFK maintains map information in the form of a state vector and a correlation matrix. In another implementation, the localization component 1204 and the map-building component 1202 can use a Rao-Blackwellised filter to perform the SLAM operations.

Information regarding the general topic of SLAM per se can be found in various sources, such as Durrant-Whyte, et al., "Simultaneous Localisation and Mapping (SLAM): Part I The Essential Algorithms," in IEEE Robotics & Automation Magazine, Vol. 13, No. 2, July 2006, pp. 99-110, and Bailey, et al., "Simultaneous Localization and Mapping (SLAM): Part II," in IEEE Robotics & Automation Magazine, Vol. 13, No. 3, September 2006, pp. 108-117.

The optional local tracking component 1004 described in FIG. 10 (provided by the controller 106) can perform the same operations described above. In this case, the local tracking component 1004 will operate on image information provided by the local cameras 1002, together with IMU information provided by the controller's local IMU 806.

Figure 11:
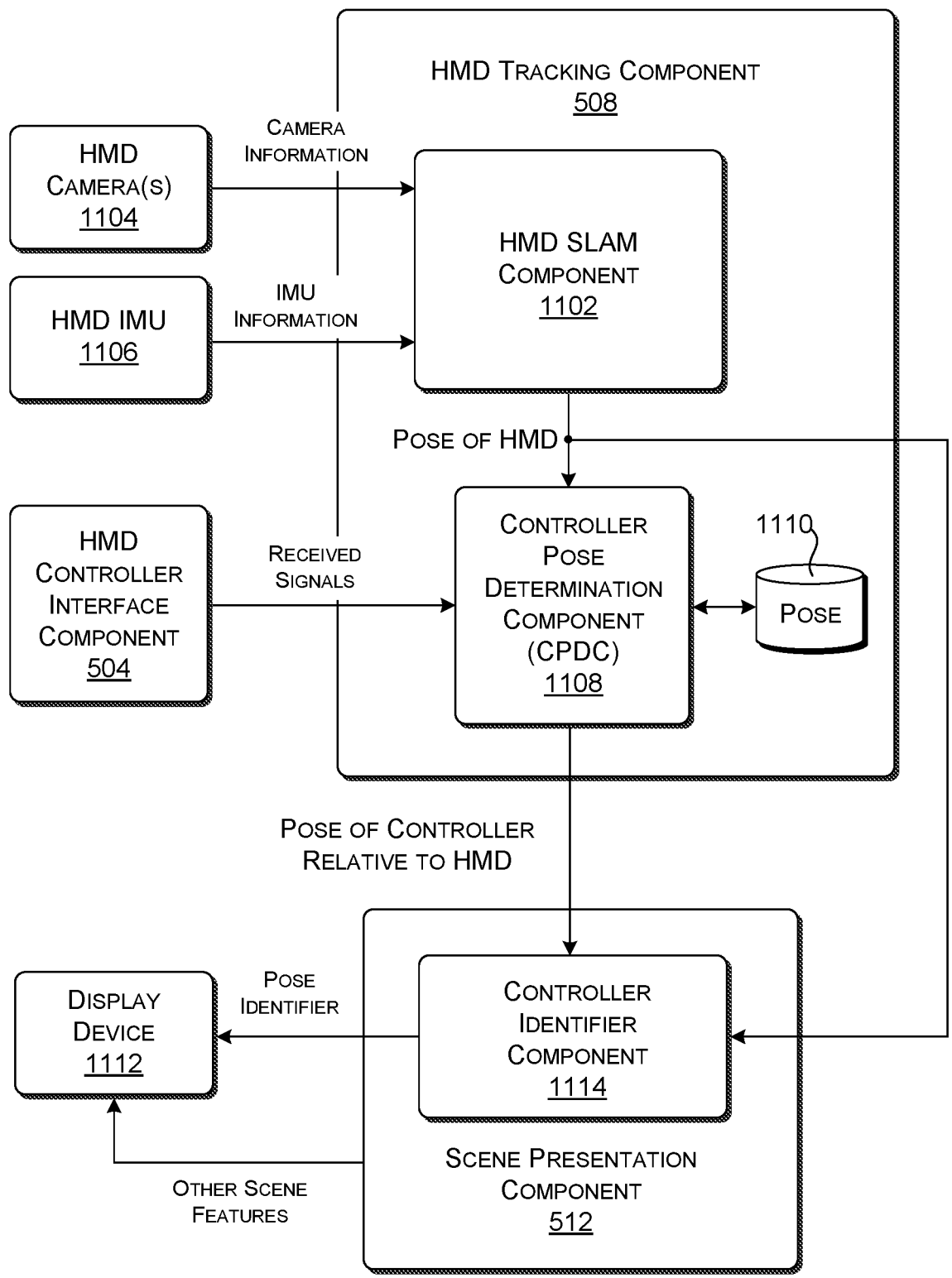
FIG. 11 shows one implementation of a tracking component and a scene presentation component, which are elements of the HMD of FIG. 5.

Now referring to the controller pose determination component (CPDC) 1108 of FIG. 11, this component can operate in different ways based on the type of signals that are received from the HMD's CIC 504. In a first case, assume that the transmitter 202 and receiver 204 correspond to the magnetic field transmitter and the magnetic field receiver shown in FIG. 6. Here, the magnetic field receiver provides signals which describe the respective strengths of the magnetic fields detected by the coils (610, 612, 614, etc.) shown in FIG. 6. The CPDC 1108 maps those signals to the x, y, and z position and orientation of the controller 106 relative to the HMD 104. That is, the CPDC 1108 can determine the distance of the controller 106 from the HMD 104 based on the attenuation of the magnetic fields. The CPDC 1108 can determine the orientation of the controller 106 relative to the HMD 104 based on relative strengths of the different magnetic fields that are received (associated with different respective axes). The CPDC 1108 can determine the absolute pose of the controller in the world coordinate system by combining the relative measurement of the CPDC 1108 with the pose information provided by the HMD SLAM component 1102.

In a second case, assume that the transmitter 202 and receiver 204 correspond to the optical transmitter and the optical receiver shown in FIG. 7. Here, the optical receiver (e.g., the cameras (712, 714)) receive image information which provides a representation of the constellation of light-emitting elements on the controller 106. The CPDC 1108 can map that received image information to the current x, y, z position and orientation of the controller 106. The CPDC 1108 can perform this task using various techniques, such as by detecting features in the received image information, and using a triangulation-based technique to map the recognized features into a pose.

Figure 13:
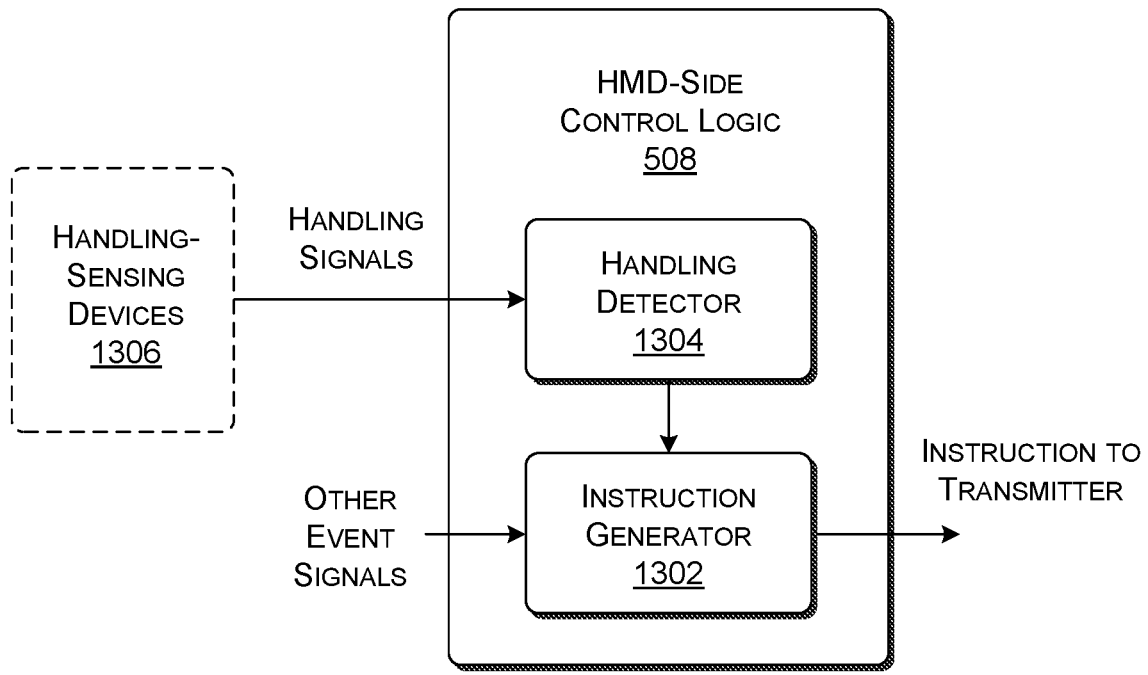
FIG. 13 shows one implementation of HMD-side control logic for use in the CIC of FIG. 8 or 9.

FIG. 13 shows one implementation of the HMD-side control logic 816 for use in the CIC 504 of FIG. 8 or 9. The HMD-side control logic 816 includes an instruction generator 1302 for generating instructions to send to the transmitter 202. The transmitter 202 may be implemented by the controller 106 (per the implementation of FIG. 8) or the HMD 104 (per the implementation of FIG. 9). The instruction generator 1302 generates instructions based on received event signals. In some cases, an event signal may indicate that an initiation event 306 has occurred. An initiation event 306 marks the beginning of the elevated-power phase 302. In other cases, an event signal may indicate that a termination event 308 has occurred. An optional termination event 308 marks the ending of the elevated-power phase 302.

The initiation event 306 can correspond to any of: a) a situation in which the user has donned the HMD 104 or otherwise turned on the HMD 104, and in which the HMD 104 determines that the controller 106 is connected to the HMD 104 via a data channel (e.g., via the communication path 814) but is otherwise not detectable using the receiver 204; b) a situation in which the user makes an explicit command to begin the elevated-power phase 302; c) a situation in which the HMD 104 determines that it is not receiving signals from the receiver 204 having sufficient quality, e.g., as assessed with respect to the signal-to-noise ratio of the signals, etc.

The termination event 308 may correspond to any of: a) a situation in which a time-out period has lapsed without the system 102 having detected the controller 106, wherein the time-out period commences at the start of the elevated-power phase 302; b) a situation in which evidence is received that indicates that the controller 106 is being handled by the user; c) a situation in which the user makes an explicit command to stop the elevated-power phase 302; d) a situation in which the HMD 104 determines that it is now receiving signals from the receiver 204 having sufficient quality, etc.

In one implementation, the instruction generator 1302 can operate by mapping an event signal into an appropriate event interpretation, e.g., using a lookup table or the like. For instance, the instruction generator 1302 can map an event signal that is produced when the user turns on the HMD 104 (and when a connected controller is not detected) to a determination that an initiation event has occurred. The instruction generator 1302 can map an event signal that indicates that the controller 106 is moving to a determination that a termination event has occurred, and so on.

A handling detector 1304 determines whether the controller 106 is likely being handled by a user based on handling signals provided by one or more handling-sensing devices 1306 provided by the controller 106. The handling-sensing devices 1306 can include the IMU 806 provided by the controller 106 and/or one or more touch sensors provided by the controller 106, etc. The touch sensors can include any of resistive touch sensors, capacitive touch sensors, optical touch sensors, etc. In one example, the handling detector 1304 determines that the controller 106 has moved when movement signals provided by the controller's IMU 806 change with respect to time.

In some cases, the instruction generator 1302 can avoid commencing the elevated-power phase 302 when the handling detector 1304 detects that the user controller 106 is currently being handled by the user. In some cases, the instruction generator 1302 can also avoid commencing the elevated-power phase 302 when it is able to determine the pose of the controller 106 based on the last-known pose 1008 provided by the local tracking component 1004 of FIG. 10.

Now referring to the surface reconstruction component 512 introduced in Subsection A.2 with reference to FIG. 5, this component provides computer-generated representations of the surfaces in the physical environment for display by the HMD's display device 1112. In one approach, the surface reconstruction component 512 can identify principal surfaces in a scene by analyzing 2D depth images captured by the HMD's depth camera system at a current time, relative to the current pose of the user. For instance, the surface reconstruction component 512 can determine that a given depth value is connected to a neighboring depth value (and therefore likely part of the same surface) when the given depth value is no more than a prescribed distance from the neighboring depth value. Using this test, the surface reconstruction component 512 can distinguish a foreground surface from a background surface. The surface reconstruction component 512 can improve its analysis of any single depth image using any machine-trained pattern-matching model and/or image segmentation algorithm. The surface reconstruction component 512 can also use any least-squares-fitting techniques, polynomial-fitting techniques, patch-assembling techniques, etc. Alternatively, or in addition, the surface reconstruction component 512 can use known fusion techniques to reconstruct the three-dimensional shapes of objects in a scene by fusing together knowledge provided by plural depth images.

Illustrative information regarding the general topic of surface reconstruction can be found in: U.S. Patent Application No. 20110109617 to Snook, et al., published on May 12, 2011, entitled "Visualizing Depth"; U.S. Patent Application No. 20150145985 to Gourlay, et al., published on May 28, 2015, entitled "Large-Scale Surface Reconstruction that is Robust Against Tracking and Mapping Errors"; U.S. Patent Application No. 20130106852 to Woodhouse, et al., published on May 2, 2013, entitled "Mesh Generation from Depth Images"; U.S. Patent Application No. 20150228114 to Shapira, et al., published on Aug. 13, 2015, entitled "Contour Completion for Augmenting Surface Reconstructions"; U.S. Patent Application No. 20160027217 to da Veiga, et al., published on Jan. 28, 2016, entitled "Use of Surface Reconstruction Data to Identity Real World Floor"; and U.S. Patent Application No. 20160364907 to Schoenberg, published on Dec. 15, 2016, entitled "Selective Surface Mesh Regeneration for 3-Dimensional Renderings."

Figure 14:
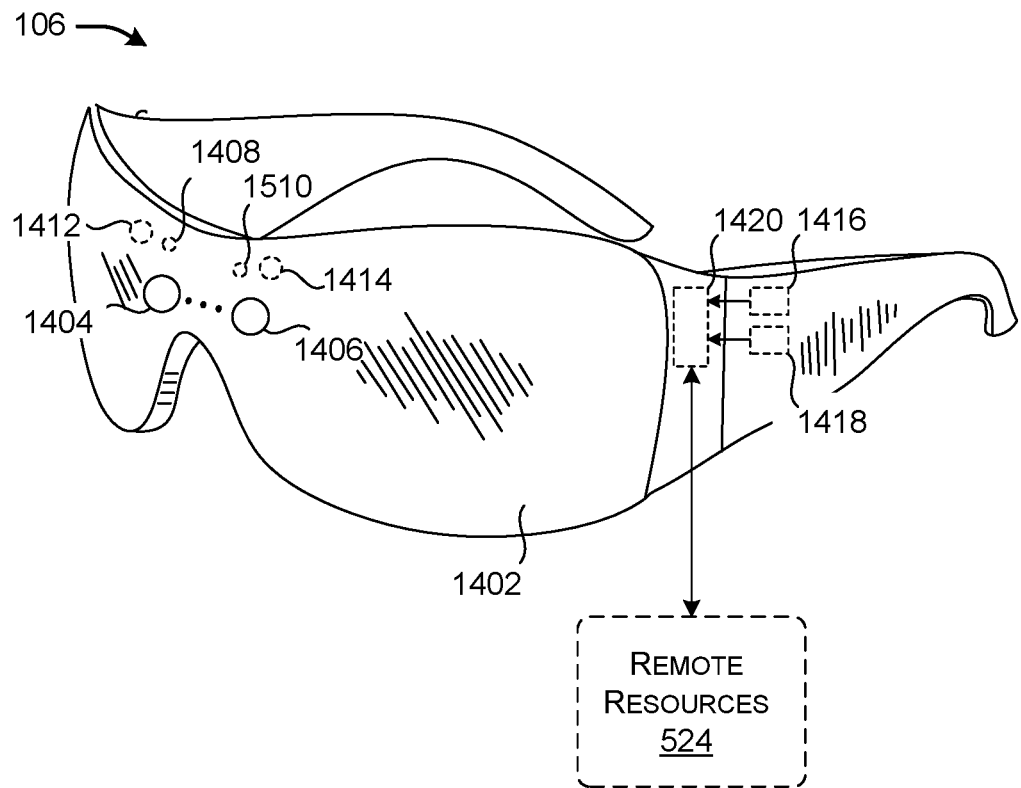
FIG. 14 shows hardware that can be used to implement the HMD of FIG. 5.

FIG. 14 shows illustrative and non-limiting structural aspects of the HMD 104. The HMD 104 includes a head-worn frame that houses or otherwise affixes a display device 1402, e.g., corresponding to a see-through display device or an opaque (non-see-through) display device. Waveguides (not shown) or other image information conduits direct left-eye images to the left eye of the user and direct right-eye images to the right eye of the user, to overall create the illusion of depth through the effect of stereopsis. Although not shown, the HMD 104 can also include speakers for delivering sounds to the ears of the user.

The HMD 104 can include any environment-facing imaging components, such as representative environment-facing imaging components 1404 and 1406. The imaging components (1404, 1406) can include RGB cameras, monochrome cameras, a depth camera system (including an illumination source), etc. While FIG. 14 shows only two imaging components (1404, 1406), the HMD 104 can include any number of such components.

The HMD 104 can optionally include an inward-facing gaze-tracking system. For example, the inward-facing gaze-tracking system can include light sources (1408, 1410) for directing light onto the eyes of the user, and cameras (1412, 1414) for detecting the light reflected from the eyes of the user.

The HMD 104 can also include other input mechanisms, such as one or more microphones 1416, an inertial measurement unit (IMU) 1418, etc. As explained above, the IMU 1418 can include one or more accelerometers, one or more gyroscopes, one or more magnetometers, etc., or any combination thereof.

A control engine 1420 can include logic for performing any of the tasks described above in FIG. 5. The control engine 1420 may optionally interact with the remote resources 524 via the communication component 528 (shown in FIG. 5), and/or the local resources 526.

B. Illustrative Processes

FIGS. 15 and 16 show processes (1502, 1602) that explain the operation of the system 102 of Section A in flowchart form. Since the principles underlying the operation of the system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 15 shows a method 1502 for determining a pose of at least one mobile controller 106. In block 1504, the system 102 determines that an initiation event has occurred that initiates a process of locating the mobile controller 106 within a physical environment. In block 1506, the system 102 sends a first instruction to the transmitter 202 in response to the initiation event, which instructs the transmitter 202 to use a first power level in emitting a magnetic field and/or electromagnetic radiation. In block 1508, the system 102 receives signals from the receiver 204 in response to detecting the magnetic field and/or electromagnetic radiation. In block 1510, the system 102 determines a relative pose of the controller 106 within the physical environment based on the signals that have been received. In block 1512, the system 102 sends a second instruction to the transmitter 202, which instructs the transmitter 202 to emit the magnetic field and/or the electromagnetic radiation using a second power level. The first power level is higher than the second power level, and the first power level enables detection of the controller 106 when the controller 106 is out-of-range with respect to a normal-use space in which the controller 106 operates when being manually manipulated by the user in a course of providing a mixed-reality experience.

The term "first power level" is to be liberally construed as referring to a single constant elevated-power level or any power level in a range of elevated-power levels. Similarly, the term "second power level" is to be liberally construed as referring to a single constant normal-use power level or any power level in a range of normal-use power levels.

FIG. 16 shows another method 1602 for determining a pose of at least one mobile controller 106. In block 1604, the system 102 determines that an initiation event has occurred that initiates a process of locating the mobile controller 106 within a physical environment. The controller 106 is used in conjunction with the head-mounted display (HMD) 104 to provide a mixed-reality experience. In block 1606, the system 102 uses the HMD 104 to send a first instruction to the transmitter 202 in response to the initiation event, which instructs the transmitter 202 to use a first power level in emitting a magnetic field and/or electromagnetic radiation. In block 1608, the system 102 receives signals by the receiver 204 in response to detecting the magnetic field and/or electromagnetic radiation emitted by the transmitter 202 at the first power level. In block 1610, the system 102 determines a pose of the controller 106 within the physical environment based on the signals that have been received. In block 1612, the system 102 presents an indicator to the user using the HMD 104 that conveys the pose of the controller 106. In block 1614, the system 102 sends a second instruction to the transmitter 202, which instructs the transmitter 202 to emit the magnetic field and/or the electromagnetic radiation using a second power level. The first power level is higher than the second power level, and the first power level enables detection of the controller 106 when the controller 106 is out-of-range with respect to a normal-use space in which the controller 106 operates when being manually manipulated by the user.

C. Representative Computing Functionality

Figure 17:
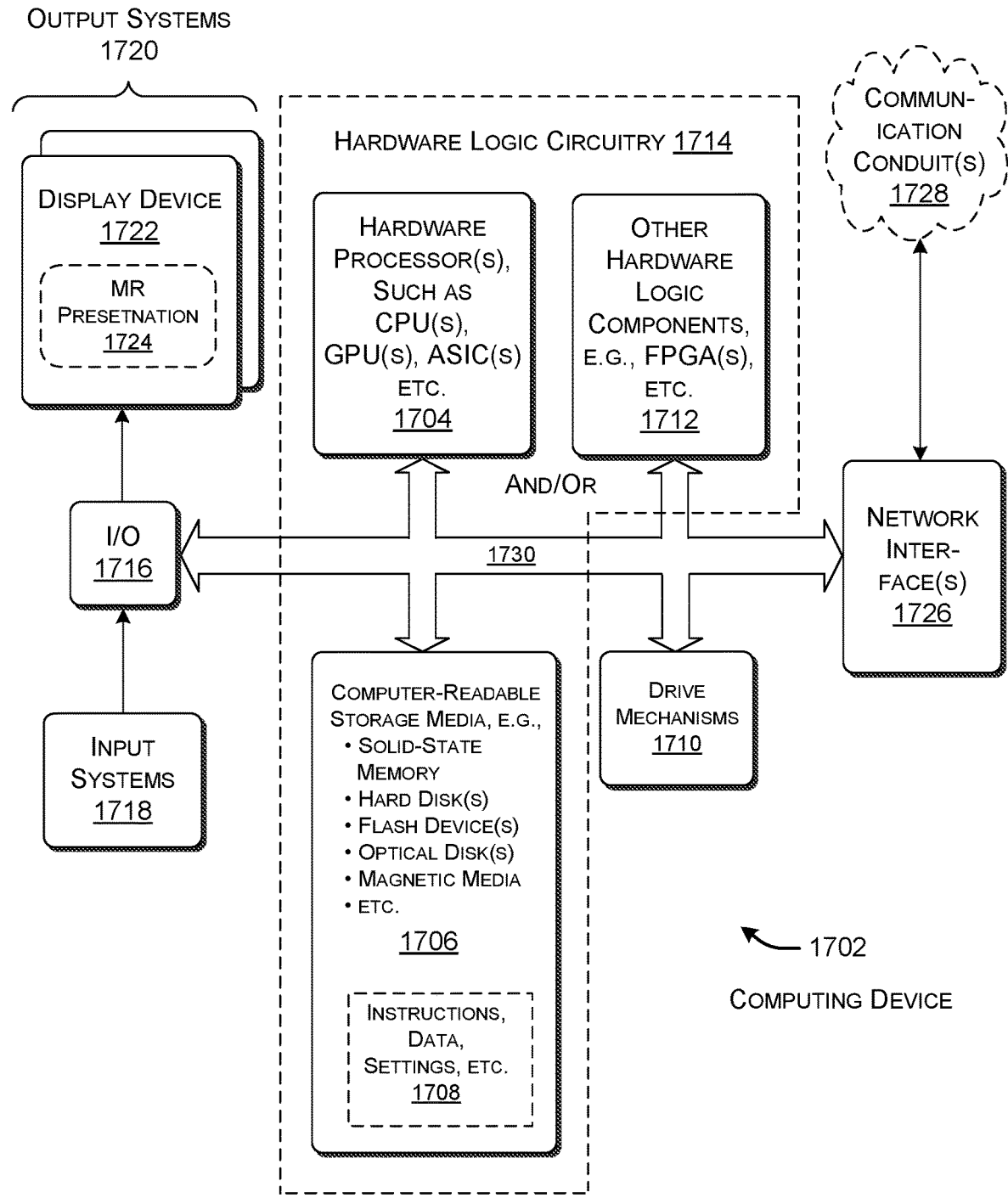
FIG. 17 shows an illustrative type of computing device that can be used to implement any processing-related aspect of the features shown in the foregoing drawings.

FIG. 17 shows a computing device 1702 that can be used to implement any aspect of the mechanisms set forth in the above-described figures. For instance, the type of computing device 1702 shown in FIG. 17 can be used to implement any processing-related aspects of the HMD 104 or the controller 106 of FIG. 1. In all cases, the computing device 1702 represents a physical and tangible processing mechanism.

The computing device 1702 can include one or more hardware processors 1704. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1702 can also include computer-readable storage media 1706, corresponding to one or more computer-readable media hardware units. The computer-readable storage media 1706 retains any kind of information 1708, such as machine-readable instructions, settings, data, etc. Without limitation, for instance, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable component of the computing device 1702. Further, any instance of the computer-readable storage media 1706 may provide volatile or non-volatile retention of information.

The computing device 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing device 1702, and/or a hardware storage unit (such as a hard disk) for retaining/archiving information on a more permanent basis. In the latter case, the computing device 1702 also includes one or more drive mechanisms 1710 (such as a hard drive mechanism) for storing and retrieving information from an instance of the computer-readable storage media 1706.

The computing device 1702 may perform any of the functions described above when the hardware processor(s) 1704 carry out computer-readable instructions stored in any instance of the computer-readable storage media 1706. For instance, the computing device 1702 may carry out computer-readable instructions to perform each block of the processes described in Section B.

Alternatively, or in addition, the computing device 1702 may rely on one or more other hardware logic components 1712 to perform operations using a task-specific collection of logic gates. For instance, the hardware logic component(s) 1712 may include a fixed configuration of hardware logic gates, e.g., that are created and set at the time of manufacture, and thereafter unalterable. Alternatively, or in addition, the other hardware logic component(s) 1712 may include a collection of programmable hardware logic gates that can be set to perform different application-specific tasks. The latter category of devices includes, but is not limited to, Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 corresponds to any combination of the hardware processor(s) 1704, the computer-readable storage media 1706, and/or the other hardware logic component(s) 1712. That is, the computing device 1702 can employ any combination of the hardware processor(s) 1704 that execute machine-readable instructions provided in the computer-readable storage media 1706, and/or one or more other hardware logic component(s) 1712 that perform operations using a fixed and/or programmable collection of hardware logic gates.

The computing device 1702 also includes an input/output interface 1716 for receiving various inputs (via input systems 1718), and for providing various outputs (via output devices 1720). Illustrative input systems and output devices where described above with reference to FIG. 5. One particular output device may include a display device 1722 associated with the HMD 104. The display device 1722 presents a mixed-reality (MR) presentation 1724. The computing device 1702 can also include one or more network interfaces 1726 for exchanging data with other devices via one or more communication conduits 1728. One or more communication buses 1730 communicatively couple the above-described components together.

The communication conduit(s) 1728 can be implemented in any manner, e.g., by a local area computer network, a wide area computer network (e.g., the Internet), point-to-point connections, etc., or any combination thereof. The communication conduit(s) 1728 can include any combination of hardwired links, wireless links, routers, gateway functionality, name servers, etc., governed by any protocol or combination of protocols.

FIG. 17 shows the computing device 1702 as being composed of a discrete collection of separate units. In some cases, the collection of units may correspond to discrete hardware units provided in a computing device chassis having any form factor. In other cases, the computing device 1702 can include a hardware logic component that integrates the functions of two or more of the units shown in FIG. 1. For instance, the computing device 1702 can include a system on a chip (SoC or SOC), corresponding to an integrated circuit that combines the functions of two or more of the units shown in FIG. 17.

The following summary provides a non-exhaustive set of illustrative aspects of the technology set forth herein.

According to a first aspect, a method for determining a pose of at least one mobile controller. The method includes: determining that an initiation event has occurred that initiates a process of locating a mobile controller within a physical environment; sending a first instruction to a transmitter in response to the initiation event, which instructs the transmitter to use a first power level in emitting a magnetic field and/or electromagnetic radiation; receiving signals from a receiver in response to detecting the magnetic field and/or electromagnetic radiation; determining a relative pose of the controller based on the signals that have been received; and sending a second instruction to the transmitter, which instructs the transmitter to emit the magnetic field and/or the electromagnetic radiation using a second power level. The first power level is higher than the second power level, and the first power level enables detection of the controller when the controller is out-of-range with respect to a space in which the controller operates when being manually manipulated by the user in a course of providing a mixed-reality experience. Each power level can refer to a single constant power level or a variable power level in a range of power levels.

According to a second aspect, the method is performed, at least in part, by a head-mounted display (HMD), the HMD providing the mixed-reality experience in conjunction with the controller.

According to a third aspect, the transmitter is a magnetic field generator, and the receiver is a magnetic field receiver.

According to a fourth aspect, the transmitter is a source of electromagnetic radiation, and the receiver includes one or more cameras for receiving the electromagnetic radiation.

According to a fifth aspect, the transmitter produces the magnetic field and/or the electromagnetic radiation using the first power level at a prescribed duty cycle.

According to a sixth aspect (dependent on the second aspect), the initiation event corresponds to a case in which the user has commenced using the HMD, and in which: (a) the HMD determines that the controller is connected to the HMD through a data channel; and (b) the HMD cannot initially detect the controller via the receiver.

According to a seventh aspect (dependent on the second aspect), the initiation event corresponds to a case in which: the user has commenced using the HMD; and the pose of the controller cannot be ascertained based on a last-known pose provided by the controller, as determined by a local tracking component provided by the controller.

According to an eighth aspect (dependent on the second aspect), the method further includes terminating the process of locating the controller when a prescribed amount of time has occurred since the initiation event.

According to a ninth aspect (dependent on the second aspect), the method further includes: receiving handling signals from a handling-sensing device associated with the controller; and terminating the process of locating the controller when the handling signals indicate that the controller is being handled by the user.

According to a tenth aspect (dependent on the second aspect), the method further includes presenting an indicator to the user using the HMD that conveys the pose of the controller.

According to an eleventh aspect (dependent on the second aspect), the transmitter is a component of the controller, and the receiver is a component of the HMD.

According to a twelfth aspect (dependent on the second aspect), the transmitter is a component of the HMD, and the receiver is a component of the controller.

According to a thirteenth aspect, a system is described for providing a mixed-reality experience. The system includes: a mobile controller for manipulation by a user within a physical environment; and a head-mounted display (HMD) worn by a head of the user. The HMD includes a tracking component configured to generate pose information, the pose information specifying: a pose of the HMD within the physical environment; and a pose of the controller relative to the HMD. The HMD also includes: a scene presentation component configured to generate a mixed-reality experience based on the pose information; and one or more output devices for presenting the mixed-reality experience to the user. The system further includes a transmitter for emitting a magnetic field and/or electromagnetic radiation, and a receiver for receiving the magnetic field and/or the electromagnetic radiation, to provide received signals. The HMD further includes a controller interface component that is configured to interact with the controller, the controller interface component being configured to: instruct the transmitter to use a first power level in emitting the magnetic field and/or the electromagnetic radiation, in response to determining that an initiation event has occurred; and instruct the transmitter to use a second power level in emitting the magnetic field and/or electromagnetic radiation when the user is manually manipulating the controller. The first power level is higher than the second power level. The tracking component is further configured to determine the pose of the controller relative to the HMD based on at least the signals received by the receiver when the transmitter is driven at the first power level, and when the controller is out-of-range with respect to a space in which the controller operates when being manually manipulated by the user. Each of the above-identified components is implemented by hardware logic circuitry, the hardware logic circuitry corresponding to: (a) one or more hardware processors that perform operations by executing machine-readable instructions stored in a memory, and/or by (b) one or more other hardware logic components that perform operations using a task-specific collection of logic gates. Each power level can refer to a single constant power level or a variable power level in a range of power levels.

According to a fourteenth aspect (dependent on the thirteenth aspect), the controller interface component is configured to instruct the transmitter to cease transmitting the magnetic field and/or the EM radiation at the first power level when a prescribed amount of time has occurred since the initiation event.

According to a fifteenth aspect (dependent on the thirteenth aspect), the controller includes a handling-sensing device that provides handling signals to the HMD. Further, the controller interface component is configured to instruct the transmitter to cease transmitting the magnetic field and/or the EM radiation at the first power level when the handling signals indicate that the controller is being handled by the user.

According to a sixteenth aspect (dependent on the thirteenth aspect), the HMD further includes a scene presentation component that is configured to present an indicator to the user that conveys the pose of the controller.

According to a seventeenth aspect (dependent on the thirteenth aspect), the transmitter is a component of the controller, and the receiver is a component of the HMD.

According to an eighteenth aspect (dependent on the thirteenth aspect), the transmitter is a component of the HMD, and the receiver is a component of the controller.

According to a nineteenth aspect (dependent on the thirteenth aspect), the controller further includes: at least one local camera for capturing images of the physical environment, to provide image information; a local tracking component for tracking the pose of the controller based on the image information, and for storing a last-known pose of the controller in a data store; and an interface component for transferring the last-known pose to the HMD. The tracking component of the HMD is configured to rely on the last-known pose, when available, to determine the pose of controller.

According to a twentieth aspect, a computer-readable storage medium is described herein for storing computer-readable instructions. The computer-readable instructions, when executed by one or more hardware processors, perform a method that includes: determining that an initiation event has occurred that initiates a process of locating a mobile controller within a physical environment, the controller being used in conjunction with a head-mounted display (HMD) to provide a mixed-reality experience; sending a first instruction by the HMD to a transmitter in response to the initiation event, which instructs the transmitter to use a first power level in emitting a magnetic field and/or electromagnetic radiation; receiving signals by a receiver in response to detecting the magnetic field and/or electromagnetic radiation emitted by the transmitter at the first power level; determining a pose of the controller within the physical environment based on the signals that have been received; presenting an indicator to the user using the HMD that conveys the pose of the controller; and sending a second instruction to the transmitter, which instructs the transmitter to emit the magnetic field and/or the electromagnetic radiation using a second power level. The first power level is higher than the second power level, and the first power level enables detection of the controller when the controller is out-of-range with respect to a space in which the controller operates when being manually manipulated by the user. Each power level can refer to a single constant power level or a variable power level in a range of power levels.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, output presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific

What is claimed is:

1. A method, performed, at least in part, by a head-mounted display (HMD), the HMD providing a mixed-reality experience in conjunction with at least one controller, comprising:
   determining that an initiation event has occurred that initiates a process of locating a mobile controller within a physical environment;
   sending a first instruction to a transmitter in response to the initiation event, which instructs the transmitter to use a first power level in emitting a magnetic field and/or electromagnetic radiation;
   receiving signals from a receiver in response to detecting the magnetic field and/or electromagnetic radiation;
   determining a pose of the controller relative to the HMD based on the signals that have been received; and
   sending a second instruction to the transmitter, which instructs the transmitter to emit the magnetic field and/or the electromagnetic radiation using a second power level,
   the first power level being higher than the second power level, and the first power level enabling detection of the controller when the controller is out-of-range with respect to a space in which the controller operates when being manually manipulated by the user in a course of providing a mixed-reality experience,
   wherein the controller further includes a local tracking component for tracking a pose of the controller, and for storing a last-known pose of the controller in a data store provided by the controller, and
   wherein one initiation event corresponds to a case in which: the user has commenced using the HMD, and the pose of the controller relative to the HMD cannot be ascertained based on a last-known pose provided by the controller.

2. The method of claim 1, wherein the transmitter is a magnetic field generator, and the receiver is a magnetic field receiver.

3. The method of claim 1, wherein the transmitter is a source of electromagnetic radiation, and the receiver includes one or more cameras for receiving the electromagnetic radiation.

4. The method of claim 1, wherein the transmitter produces the magnetic field and/or the electromagnetic radiation using the first power level at a prescribed duty cycle.

5. The method of claim 1, wherein another initiation event corresponds to a case in which the user has commenced using the HMD, and in which: (a) the HMD determines that the controller is connected to the HMD through a data channel; and (b) the HMD cannot initially detect the controller via the receiver.

6. The method of claim 1, wherein the method further includes terminating the process of locating the controller when a prescribed amount of time has occurred since the initiation event.

7. The method of claim 1, wherein the method further includes:
   receiving handling signals from a handling-sensing device associated with the controller; and
   terminating the process of locating the controller when the handling signals indicate that the controller is being handled by the user.

8. The method of claim 1, wherein the method further includes presenting an indicator to the user using the HMD that conveys the pose of the controller relative to the HMD.

9. The method of claim 1, wherein the transmitter is a component of the controller, and the receiver is a component of the HMD.

10. The method of claim 1, wherein the transmitter is a component of the HMD, and the receiver is a component of the controller.

11. A system for providing a mixed-reality experience, comprising:
   a mobile controller for manipulation by a user within a physical environment;
   a head-mounted display (HMD) worn by a head of the user, the HMD including at least:
      a tracking component configured to generate pose information, the pose information specifying: a pose of the HMD within the physical environment; and a pose of the controller relative to the HMD;
      a scene presentation component configured to generate a mixed-reality experience based on the pose information; and
      one or more output devices for presenting the mixed-reality experience to the user;
   a transmitter for emitting a magnetic field and/or electromagnetic radiation; and
   a receiver for receiving the magnetic field and/or the electromagnetic radiation, to provide received signals;
   the HMD further including a controller interface component that is configured to interact with the controller, the controller interface component being configured to:
      instruct the transmitter to use a first power level in emitting the magnetic field and/or the electromagnetic radiation, in response to determining that an initiation event has occurred; and
      instruct the transmitter to use a second power level in emitting the magnetic field and/or electromagnetic radiation when the user is manually manipulating the controller,
      the first power level being higher than the second power level, wherein the controller further includes:
      at least one local camera for capturing images of the physical environment, to provide image information;
      a local tracking component for tracking a pose of the controller based on the image information, and for storing a last-known pose of the controller in a data store; and
      an interface component for transferring the last-known pose to the HMD,
   the tracking component of the HMD being configured to determine the pose of the controller relative to the HMD based on at least the signals received by the receiver when the transmitter is driven at the first power level, and when the controller is out-of-range with respect to a space in which the controller operates when being manually manipulated by the user, and when the pose of the controller relative to the HMD cannot be ascertained based on the last-known pose provided by the controller,
   each component being implemented by hardware logic circuitry, the hardware logic circuitry corresponding to: (a) one or more hardware processors that perform operations by executing machine-readable instructions stored in a memory, and/or by (b) one or more other hardware logic components that perform the operations using a task-specific collection of logic gates.

12. The system of claim 11, wherein the controller interface component is configured to instruct the transmitter to cease transmitting the magnetic field and/or the EM radiation at the first power level when a prescribed amount of time has occurred since the initiation event.

13. The system of claim 11,
wherein the controller includes a handling-sensing device that provides handling signals to the HMD, and
wherein the controller interface component is configured to instruct the transmitter to cease transmitting the magnetic field and/or the EM radiation at the first power level when the handling signals indicate that the controller is being handled by the user.

14. The system of claim 11, wherein the HMD further includes a scene presentation component that is configured to present an indicator to the user that conveys the pose of the controller relative to the HMD.

15. The system of claim 11, wherein the transmitter is a component of the controller, and the receiver is a component of the HMD.

16. The system of claim 11, wherein the transmitter is a component of the HMD, and the receiver is a component of the controller.

17. A computer-readable storage medium for storing computer-readable instructions, the computer-readable instructions, when executed by one or more hardware processors, performing a method that comprises:
   determining that an initiation event has occurred that initiates a process of locating a mobile controller within a physical environment,
   the controller being used in conjunction with a head-mounted display (HMD) to provide a mixed-reality experience;
   sending a first instruction by the HMD via a data channel to a transmitter in response to the initiation event, which instructs the transmitter to use a first power level in emitting a magnetic field and/or electromagnetic radiation;
   receiving signals by a receiver in response to detecting the magnetic field and/or electromagnetic radiation emitted by the transmitter at the first power level, the receiver receiving signals through a path other than the data channel;
   determining a pose of the controller relative to the HMD based on the signals that have been received;
   presenting an indicator to the user on a display device of the HMD that conveys the pose of the controller relative to the HMD; and
   sending a second instruction to the transmitter via the data channel, which instructs the transmitter to emit the magnetic field and/or the electromagnetic radiation using a second power level, and stop emitting the magnetic field and/or the electromagnetic radiation at the first power level,
   the first power level being higher than the second power level, and the first power level enabling detection of the controller when the controller is out-of-range with respect to a space in which the controller operates when being manually manipulated by the user,
   wherein one initiation event corresponds to a case in which: (a) the HMD determines that the controller is connected to the HMD through the data channel; and (b) the HMD cannot initially detect the controller via the receiver, and
   wherein the controller provides the transmitter and the HMD provides the receiver.

18. The computer-readable storage medium of claim 17, wherein said presenting an indicator includes presenting one or more markers that reveal the pose of the controller.

19. The computer-readable storage medium of claim 17, wherein the method further includes terminating the process of locating the controller when a prescribed amount of time has occurred since the initiation event.

* * * * *